(12) United States Patent
Badillo

(10) Patent No.: US 10,829,055 B2
(45) Date of Patent: Nov. 10, 2020

(54) RACK SYSTEM FOR VEHICLES

(71) Applicant: INTELLIGENT DESIGNS 2000 CORP., Aurora, CO (US)

(72) Inventor: Paul Badillo, Littleton, CO (US)

(73) Assignee: INTELLIGENT DESIGNS 2000 CORP., Aurora, CO (US)

( * ) Notice: Subject to any disclaimer, the term of this patent is extended or adjusted under 35 U.S.C. 154(b) by 0 days.

(21) Appl. No.: 16/355,179

(22) Filed: Mar. 15, 2019

(65) Prior Publication Data
US 2019/0283683 A1 Sep. 19, 2019

Related U.S. Application Data

(60) Provisional application No. 62/644,184, filed on Mar. 16, 2018.

(51) Int. Cl.
*B60R 9/06* (2006.01)

(52) U.S. Cl.
CPC .................................... *B60R 9/06* (2013.01)

(58) Field of Classification Search
CPC .... B60R 9/06; B60R 9/08; B60R 9/10; B60R 9/048
See application file for complete search history.

(56) References Cited

U.S. PATENT DOCUMENTS

| | | |
|---|---|---|
| D30,369 S | 3/1899 | Mandt |
| D33,754 S | 12/1900 | Hien |
| 704,436 A | 7/1902 | Cluff |
| 744,113 A | 11/1903 | Rye |
| 1,564,776 A | 12/1925 | Green |
| 1,606,954 A | 11/1926 | Moen et al. |
| 2,387,779 A | 10/1945 | Strauss |
| 2,492,841 A | 12/1949 | Burkey |
| 2,521,815 A | 9/1950 | Will |
| 2,663,472 A | 12/1953 | Belgau |
| 2,784,888 A | 3/1957 | Lecanu-Deschamps |
| 2,800,264 A | 7/1957 | McFadyen |
| 2,967,635 A | 1/1961 | Barnett |
| 3,158,301 A | 11/1964 | Hedgepeth |
| 3,215,323 A | 11/1965 | Bonitt |
| 3,260,929 A | 7/1966 | Hedgepeth |
| 3,330,454 A | 7/1967 | Bott |
| 3,531,006 A | 9/1970 | Farchmin |
| D223,753 S | 6/1972 | Seals |
| 3,762,587 A | 10/1973 | Longee, Sr. |
| 3,765,713 A | 10/1973 | Suitt |
| 3,902,642 A | 9/1975 | McNeece |
| 3,905,499 A | 9/1975 | Speidel |
| 3,915,323 A | 10/1975 | Underhill |
| D243,447 S | 2/1977 | Smith, III et al. |

(Continued)

OTHER PUBLICATIONS

U.S. Appl. No. 29/535,865, filed Aug. 11, 2015, Badillo.

(Continued)

*Primary Examiner* — Corey N Skurdal
(74) *Attorney, Agent, or Firm* — Sheridan Ross P.C.

(57) ABSTRACT

A rotatable rack is provided. The rotatable rack is rotatably interconnected to a vehicle proximal to the vehicle's windshield such that the rotatable rack is capable of moving from a first position of use adjacent to the windshield to a second position away from the windshield where the rotatable rack is provided proximal to a hood of the vehicle.

20 Claims, 18 Drawing Sheets

(56) References Cited

U.S. PATENT DOCUMENTS

| | | | |
|---|---|---|---|
| 4,240,571 A | 12/1980 | Ernst | |
| 4,249,683 A | 2/1981 | Park | |
| 4,336,897 A | 6/1982 | Luck | |
| 4,350,471 A | 9/1982 | Lehman | |
| 4,817,834 A | 4/1989 | Weiler | |
| 4,948,024 A | 8/1990 | Warner et al. | |
| 4,995,538 A | 2/1991 | Marengo | |
| D324,664 S | 3/1992 | Burnette | |
| 5,171,083 A | 12/1992 | Rich | |
| 5,320,061 A | 6/1994 | Laughlin et al. | |
| 5,381,939 A | 1/1995 | Tippets | |
| D359,134 S | 6/1995 | Toews | |
| 5,560,525 A | 10/1996 | Grohmann et al. | |
| D406,557 S | 3/1999 | Bentley | |
| D413,562 S | 9/1999 | Van Dusen et al. | |
| D415,718 S * | 10/1999 | Aghaci | D12/91 |
| 6,003,633 A | 12/1999 | Rolson | |
| 6,015,074 A | 1/2000 | Snavely et al. | |
| D422,553 S | 4/2000 | VonDuyke | |
| 6,116,378 A | 9/2000 | Barrow | |
| 6,126,051 A | 10/2000 | Potter | |
| D434,364 S | 11/2000 | Bauer et al. | |
| 6,152,339 A | 11/2000 | Kreisler | |
| D434,718 S | 12/2000 | Kreisler | |
| D435,510 S | 12/2000 | Quidort | |
| 6,179,180 B1 | 1/2001 | Walker et al. | |
| D442,289 S | 5/2001 | Ziaylek et al. | |
| 6,308,874 B1 | 10/2001 | Kim et al. | |
| 6,425,508 B1 | 7/2002 | Cole et al. | |
| 6,428,263 B1 | 8/2002 | Schellens | |
| D463,358 S | 9/2002 | Thomas | |
| D470,451 S | 2/2003 | Bushart et al. | |
| 6,561,397 B1 | 5/2003 | Bauer et al. | |
| 6,581,813 B2 | 6/2003 | Bove et al. | |
| D477,562 S | 7/2003 | McCoy et al. | |
| 6,604,606 B1 | 8/2003 | McDougal et al. | |
| D479,884 S | 9/2003 | Berryman | |
| D481,003 S | 10/2003 | Bauer et al. | |
| 6,715,652 B2 | 4/2004 | Kmita et al. | |
| D490,163 S | 5/2004 | Thurston | |
| 6,739,349 B2 | 5/2004 | Kastenschmid et al. | |
| 6,755,332 B2 * | 6/2004 | Crane | B60R 9/00 224/321 |
| 6,772,928 B2 | 8/2004 | Ford et al. | |
| D508,015 S | 8/2005 | Badillo | |
| D512,783 S | 12/2005 | Badillo | |
| D520,938 S | 5/2006 | Badillo | |
| 7,055,454 B1 | 6/2006 | Whiting et al. | |
| D537,404 S | 2/2007 | Bauer et al. | |
| 7,226,226 B2 | 6/2007 | Troman | |
| 7,226,266 B2 | 6/2007 | Henderson et al. | |
| 7,249,927 B2 | 7/2007 | Wooten et al. | |
| D549,838 S | 8/2007 | Badillo | |
| D558,123 S | 12/2007 | Murillo | |
| D564,419 S | 3/2008 | Clontz | |
| D578,952 S | 10/2008 | Badillo | |
| D603,321 S | 11/2009 | Kramer | |
| D621,328 S | 8/2010 | Sistare et al. | |
| D624,005 S | 9/2010 | Winner et al. | |
| D638,333 S | 5/2011 | Freeman | |
| D650,316 S | 12/2011 | Pirolo et al. | |
| 8,496,146 B2 | 7/2013 | Badillo | |
| 8,591,164 B2 | 11/2013 | Prosser | |
| D765,577 S | 9/2016 | Kmita et al. | |
| D772,783 S | 11/2016 | Schleef | |
| 9,676,343 B2 | 6/2017 | Badillo | |
| D793,946 S | 8/2017 | Badillo | |
| D815,012 S | 4/2018 | Badillo | |
| D825,924 S | 8/2018 | Tuang | |
| D840,914 S | 2/2019 | Badillo | |
| D840,915 S | 2/2019 | Badillo | |
| D840,916 S | 2/2019 | Badillo | |
| 2005/0082326 A1 | 4/2005 | Badillo | |
| 2005/0092796 A1 * | 5/2005 | Essig | B60R 9/00 224/321 |
| 2005/0095102 A1 | 5/2005 | Watson | |
| 2011/0101056 A1 | 5/2011 | Barkey | |
| 2017/0203697 A1 | 7/2017 | Badillo | |
| 2018/0319270 A1 * | 11/2018 | Tier | B60K 13/02 |

OTHER PUBLICATIONS

U.S. Appl. No. 15/586,769, filed May 4, 2017, Badillo.

U.S. Appl. No. 29/612,929, filed Aug. 4, 2017, Badillo.

U.S. Appl. No. 29/640,814, filed Mar. 16, 2018, Badillo.

U.S. Appl. No. 29/686,324, filed Apr. 3, 2019, Badillo.

Advertisement: Yakima Spare Tire Carrier, Cargo Basket for Roof Racks, available at http://www.rackoutfitters.com/catalog/yakima_spare_tire_carrier_1836640.htm., dated Jul. 7, 2003, 1 page.

Advertisement: Thule 840—Playpen Basket, Cargo Basket for Roof Racks, available at http://www.rackoutfitters.com/catalog/thule_840_-_playpen_basket_1885452.htm, dated Jul. 7, 2003, 1 page.

Advertisement: SURCO, Products, Inc., "Basket rack—it just flat out carries what you need to take," available at http://www.everythingsuv.com/surco_safari_roof_racks-esuv.asp, dated Jul. 7, 2003, 10 pages.

Advertisement: KargoMaster, Kargo Master Safari Racks, available at http://www.kargomaster.com/jeep23.asp?rack=sport_jeep, Jul. 7, 2007, 1 page.

Advertisement: KargoMaster, The Bushman Steel Rack, available at http://www.kargomaster.com/bushman.asp?type=Jeep, dated Jul. 7, 2003, 1 page.

Advertisement: KargoMaster, Seregenti Telescoping Steel Rack, available at http://www.kargomaster.com/seregenti.asp?type=Jeep, dated Jul. 7, 2003, 1 page.

Advertisement: Bauer Vehicle Gear Roof Racks, Roof Storage, Bike Storage & Pet Barriers from Eve, available at http://www.everythingsuv.com/bvg_products-esuv.asp, Jul. 7, 2003, 2 pages.

Advertisement: Manik Original Off-Road Equipment, Hummer Rough Terrain Package New Product Release "Tilt-Forward 1-Piece Front Bar," 2002, 1 page.

Advertisement: Manik Original Off-Road Equipment, Hummer Rough Terrain Package New Product Release "Combination Tube Step Rocker Bar," 2002, 1 page.

Advertisement: Congo Cage Jeep Rack, available at http://www.kargomaster.com/item.asp?id=62, printed Apr. 17, 2009, 13 pages.

Product Literature entitled, "921—Dave's Rack 921-12X," Olympic 4X4, date unknown, 10 pages.

Advertisement: 921—Daves Rack, Olympic 4X4 Products for over 60 years, available at http://olympic4X4products.com/utility-racks/921-daves-rack, printed Jan. 14, 2011, 3 pages.

"Installation Guide: BR-JPTJ2D-1-0 BajaRack JEEP TJ 2 Doors," BajaRack Adventure Equipment, 4 page, first sold 2013.

"BR-JPJK—Series Installation Instructions," BajaRack Adventure Equipment, 5 pages, first sold 2013.

"GOBI Jeep JL 4 Door Roof Rack Gen 1 Installation Instructions," Intelligent Designs 2000 Corporation, Aug. 29, 2018, Part No. GJJLRG1, 26 pages [retrieved online from: www.gobiracks.com/wp-content/uploads/2019/01/JEEP-JL-Rack-Install-Guide.pdf].

"Installation Guide: BR-JP-JK4D-1-0 BajaRack JEEP JK 4 Doors," BajaRack Adventure Equipment, 6 pages, first sold 2013.

Official Action for U.S. Appl. No. 12/861,034 dated Oct. 4, 2012, 16 pages.

Notice of Allowance for U.S. Appl. No. 12/861,034 dated Mar. 29, 2013, 7 pages.

Official Action for U.S. Appl. No. 13/942,489 dated May 3, 2016, 11 pages.

Final Action for U.S. Appl. No. 13/942,489 dated Sep. 29, 2016, 15 pages.

Notice of Allowance for U.S. Appl. No. 13/942,489 dated Feb. 7, 2017, 5 pages.

Official Action for U.S. Appl. No. 29/535,865 dated Aug. 23, 2016, 5 pages.

Final Action for U.S. Appl. No. 29/535,865 dated Feb. 2, 2017, 8 pages.

Official Action for U.S. Appl. No. 29/535,865, dated Nov. 3, 2017 10 pages.

(56) References Cited

OTHER PUBLICATIONS

Official Action for U.S. Appl. No. 29/535,865, dated Jun. 28, 2018, 9 pages.
Notice of Allowance for U.S. Appl. No. 29/535,865, dated Jan. 14, 2019, 8 pages.
Notice of Allowance for U.S. Appl. No. 29/535,957 dated Mar. 27, 2017, 6 pages.
Notice of Allowance for U.S. Appl. No. 29/612,929 dated Sep. 27, 2018, 7 pages.
Notice of Allowance for U.S. Appl. No. 29/612,927 dated Sep. 27, 2018, 7 pages.
Notice of Allowance for U.S. Appl. No. 29/612,924 dated Sep. 27, 2018, 7 pages.
Official Action for U.S. Appl. No. 15/586,769 dated Jul. 17, 2017 14 pages.
Official Action for U.S. Appl. No. 15/586,769, dated Dec. 5, 2017 9 pages.
Official Action for U.S. Appl. No. 15/586,769, dated Jun. 26, 2018, 8 pages.
Notice of Allowance for U.S. Appl. No. 15/586,769, dated Jan. 28, 2019, 5 pages.
Notice of Allowance for U.S. Appl. No. 29/612,930, dated Sep. 27, 2018, 7 pages.
Official Action for U.S. Appl. No. 15/344,244, dated Jun. 21, 2018, 11 pages.
Notice of Allowance for U.S. Appl. No. 15/344,244, dated Feb. 21, 2019, 14 pages.
Official Action for U.S. Appl. No. 16/516,530, dated Feb. 3, 2020 9 pages.

\* cited by examiner

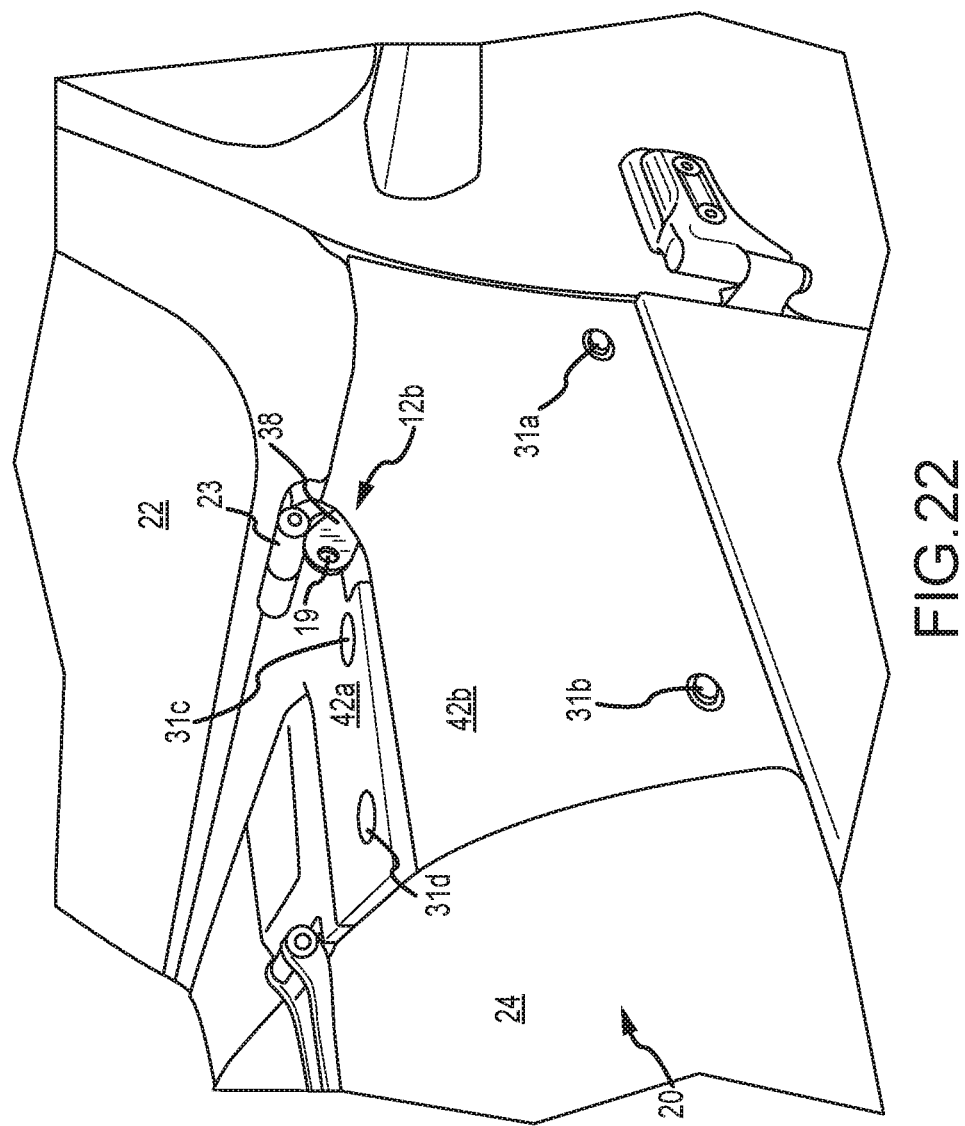

RACK SYSTEM FOR VEHICLES

CROSS REFERENCE TO RELATED APPLICATIONS

This application claims priority and benefits under 35 U.S.C. § 119(e) to U.S. Provisional Patent Application Ser. No. 62/644,184 filed on Mar. 16, 2018, which is incorporated herein in its entirety by reference.

FIELD

Embodiments of the present disclosure are generally related to storage and accessory racks for interconnection to motor vehicles. More specifically, one embodiment of the present disclosure comprises a rack member or support member operable to be provided adjacent a forward windshield portion of a vehicle. The rack member is associated with a fixed portion of a vehicle and optionally with a further rack member, such as a roof rack. The rack member is selectively movable such that the rack member is capable of moving from a first position of use to a second position of use.

BACKGROUND

Storage racks are often installed on vehicles to permit carrying additional items that will not fit within the vehicle or are not desirable to carry in the vehicle. Storage racks also often accommodate a variety of accessories including lights, such as fog lights. It is sometimes necessary to remove the storage rack to make modifications to the vehicle. For example, the storage rack of some vehicles must be removed in order to gain access to various roof elements for removal or replacement. That is, in order to facilitate changing the exterior of a vehicle, the storage rack must be removed. This is often a cumbersome and difficult task and sometimes the aforementioned lights and associated wiring must also be removed. To complicate this task, storage racks are often heavy, and may be difficult and/or dangerous to remove and replace by a lone individual. U.S. Pat. No. 9,676,343 and U.S. Patent App. Pub. 2017/0203697 which are both by Badillodisclose rotatable rack elements and racks with the ability to accommodate lighting features and are hereby each incorporated by reference in their entirety.

Many known storage racks and rack systems prevent vehicle features from moving or operating as they are intended. For example, storage racks may prevent access to or operation of doors, liftgates, windows, and windshields when installed. Some vehicles, including the JEEP WRANGLER JL™, comprise forward folding windshields that are capable of rotating from a first position of use to a second position in which the windshield is provided substantially adjacent to a hood of the vehicle. Known storage racks and systems comprise supports or other members that prevent operation of these folding windshields.

SUMMARY

It is an object of the present disclosure to provide a storage rack, a rack member, and/or a rack system that is operable to cooperate with and enable a forward folding motion of a windshield, for example. Although various embodiments of the present disclosure are particularly well suited for use with the aforementioned windshield system, it should be recognized that the inventions provided herein are not limited to such applications. Indeed, inventive concepts of the present disclosure may be provided in combination with and useful in different settings, vehicles, and applications.

In one embodiment, a convertible roof rack adapted for use with a vehicle is provided. The convertible roof rack comprises a rack member adapted to be associated with a vehicle and positioned adjacent to a windshield of the vehicle. The rack member is capable of movement from a first position of use adjacent to the windshield to a second position of use away from the windshield, for example, proximate to a hood of the vehicle. A support structure is interconnected to the rack member and adapted to be interconnected to the vehicle.

Various embodiments of the present disclosure provide for a rack frame or rack member that is configured to be connected to a forward portion of a vehicle and which does not substantially obstruct vehicle occupants' views through the windshield. Embodiments of the present disclosure further provide for a forward rack support or bracket member that comprises at least one hinge point. The rack member can be interconnected to the bracket member and the hinge point such that the rack member is rotatable from a first position (e.g. adjacent the windshield, or generally vertical) to a second position (e.g. adjacent the vehicle's hood, generally horizontal).

In some embodiments, the hinge point is provided by first and second bracket members that are securable to a vehicle. The first and second bracket members are configured to be connected to the vehicle with their respective hinge points positioned to extend upwardly above the hood of the vehicle. In one embodiment, the first and second bracket members can be affixed to the vehicle with a plate portion positioned in a gap between two metal trim members of the vehicle, the hinge point of each bracket extending through the plate portions.

In alternative embodiments, the hinge point is provided along a length of a frame member of the rack member. For example, a joint or hinge is contemplated as being provided in each of a left and a right side support member provided proximal to the windshield such that the joints or hinges allow the rack member to hinge or rotate toward and away from the windshield.

In various embodiments, rack members of the present disclosure are operable to support a roof rack frame or similar member. Rack members of the present disclosure are further operable to receive and support various additional elements including, but not limited to, light bars, lighting elements, accessories, tools (e.g. shovels, fire extinguishers, etc.), and similar features. Accordingly, in some embodiments, the rack member comprises a light bar for a vehicle.

One aspect of the present invention is a rotatable rack adapted for use with a vehicle, comprising: (1) a first bracket member that is selectively securable to the vehicle such that a first through-hole of the first bracket member extends from a first gap between exterior panels of the vehicle; (2) a second bracket member that is selectively securable to the vehicle such that a second through-hole of the second bracket member extends from a second gap between exterior panels of the vehicle; and (3) a rack member adapted to be associated with the vehicle and positioned adjacent to a windshield of the vehicle, the rack member configured to be pivotally interconnected to the first and second through-holes such that the rack member is capable of movement from a first position of use adjacent to the windshield to a second position of use proximate to a hood of the vehicle.

In one embodiment, the first bracket member comprises a first clamp plate configured to engage a first fastener under the exterior panels of the vehicle. The second bracket member can comprise a second clamp plate configured to engage a second fastener under the exterior panels of the vehicle. Optionally, in one embodiment, the first and second clamp plates each include a slot to receive the respective first and second fasteners. The first fastener can be associated with a first hinge pivotally interconnecting the windshield to the vehicle. Similarly, the second fastener can be associated with a second hinge pivotally interconnecting the windshield to the vehicle.

In one embodiment, the first bracket member includes a first transverse member extending from the first clamp plate. The first transverse member is configured to extend outwardly above the exterior panels of the vehicle when the first bracket member is secured to the vehicle. The second bracket member can also include a second transverse member extending from the second clamp plate. The second transverse member is configured to extend outwardly above the exterior panels of the vehicle when the second bracket member is secured to the vehicle. In one embodiment, the first through-hole is formed through the first transverse member and the second through-hole is formed through the second transverse member.

In one embodiment, the rack member is rotatable about a pivot axis that is defined by the first and second through-holes. Optionally, the pivot axis is above the exterior panels and is substantially parallel to a wheel axle of the vehicle. In another embodiment, the pivot axis is approximately parallel to a rotational axis defined by first and second hinges associated with the windshield of the vehicle.

In one embodiment, the rotatable rack further comprises a first mounting bracket configured to be secured to a first support member of the rack member. The first mounting bracket includes a first aperture to receive a first cowling fastener. The first cowling fastener is operable to interconnect the first mounting bracket and a first exterior panel to the vehicle. The first exterior panel defining part of the first gap between exterior panels. Optionally, the first mounting bracket includes a first catch extending transverse to the first mounting bracket. The first catch extends in a direction toward the vehicle to contact an edge of the first support member when the first mounting bracket is interconnected to the vehicle.

In another embodiment, the rotatable rack further comprises a second mounting bracket configured to be secured to a second support member of the rack member. The second mounting bracket includes a second aperture to receive a second cowling fastener. The second cowling fastener is operable to interconnect the second mounting bracket and a second exterior panel to the vehicle. The second exterior panel defining part of the second gap between exterior panels. Optionally, the second mounting bracket includes a second catch extending transverse to the second mounting bracket. The second catch extends in a direction toward the vehicle to contact an edge of the second support member when the second mounting bracket is interconnected to the vehicle.

Optionally, the rotatable rack can further comprise a first support strap secured to a door hinge of the vehicle. The first support strap can include a first strap aperture adapted to be aligned with the first aperture of the first mounting bracket. In this manner the first cowling fastener can extend through both the first aperture and the first strap aperture.

In one embodiment, to rotate the rack member from the first position of use to the second position of use the first mounting bracket is separated from the first support member of the rack member and the first cowling fastener is removed from the first aperture.

It is another aspect of the present invention to provide a system for pivotally interconnecting a rotatable rack member proximate to a windshield of a vehicle. The system includes, but is not limited to: (1) a bracket member adapted to be interconnected to the vehicle, including: (a) a clamp plate portion with a first aperture to receive a fastener to secure the bracket member to the vehicle, the clamp plate portion being configured to be positioned inwardly relative to a first exterior panel and a second exterior panel of the vehicle when the bracket member is secured to the vehicle; (b) a transverse portion extending from the clamp plate portion, the transverse portion adapted to extend through a gap between the first and second exterior panels when the bracket member is secured to the vehicle; and (c) a bracket aperture formed through the transverse portion that is configured to be positioned outwardly relative to the first and second exterior panels when the bracket member is secured to the vehicle; and (2) a support member extending from the rack member, the support member including a flange with a flange aperture configured to align with the bracket aperture of the bracket member such that a fastener can be positioned through the flange aperture and the bracket aperture to pivotally interconnect the rack member to the bracket member, the fastener defining a pivot axis about which the rack member can rotate from a first position of use proximate to the windshield to a second position of use proximate to a hood of the vehicle. In one embodiment, the pivot axis is generally parallel to a rotation axis defined by a hinge interconnected to the windshield. Additionally, or alternatively, the pivot axis can be approximately parallel to an axle of the vehicle.

In one embodiment, the system further comprises a mounting bracket configured to be attached to the support member. The mounting bracket optionally include a through hole to receive a cowling fastener. In this manner, the cowling fastener can interconnect the mounting bracket and the second exterior panel to the vehicle. In one embodiment, the mounting bracket includes a catch configured to contact a rearward portion of the support member when the rack member is in the first position of use proximate to the windshield.

In one embodiment, the system further comprises a support strap. The support strap can include a first portion with a strap aperture to receive the cowling fastener and a second portion to engage a hinge plate of a door hinge of the vehicle.

Optionally, the rack member further comprises an attachment plate that is configured to interconnect the rack member to a roof rack interconnected to the vehicle.

Still another aspect of the present invention is to provide a method of interconnecting a rotatable rack to a vehicle, comprising: (1) securing a first bracket member to the vehicle such that a first through-hole of the first bracket member extends from a first gap between exterior panels of the vehicle such that the first through-hole is positioned outwardly of the exterior panels; (2) securing a second bracket member to the vehicle such that a second through-hole of the second bracket member extends from a second gap between exterior panels of the vehicle such that the second through-hole is positioned outwardly of the exterior panels; and (3) pivotally interconnecting the rotatable rack to the first and second bracket members by securing first and second fasteners through the first and second through-holes such that the rotatable rack is capable of movement from a first position of use adjacent to a windshield of the vehicle to a second position of use proximate to a hood of the vehicle.

In one embodiment, pivotally interconnecting the rotatable rack to the first and second bracket members further comprises one or more of: (a) extending the first fastener through the first through-hole and through a first flange aperture of a first flange of the rotatable rack; and (b) extending the second fastener through the second through-hole and through a second flange aperture of a second flange of the rotatable rack.

Optionally, the method can include at least one of: (a) securing a first mounting bracket to a first support member of the rotatable rack; (b) interconnecting the first mounting bracket and a first exterior panel to the vehicle with a first cowling fastener, the first exterior panel defining part of the first gap between exterior panels; (c) securing a second mounting bracket to a second support member of the rotatable rack; and (d) interconnecting the second mounting bracket and a second exterior panel to the vehicle with a second cowling fastener, the second exterior panel defining part of the second gap between exterior panels.

In one embodiment, securing the first bracket member to the vehicle comprises: (a) removing a first cowling fastener to remove the first exterior panel from the vehicle; (b) loosening a first hinge fastener associated with a first windshield hinge of the vehicle; (c) sliding a first clamp plate of the first bracket member under the first windshield hinge, the first clamp plate including a slot to receive the first hinge fastener; and (d) tightening the first hinge fastener to secure the first bracket member to the vehicle.

This Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
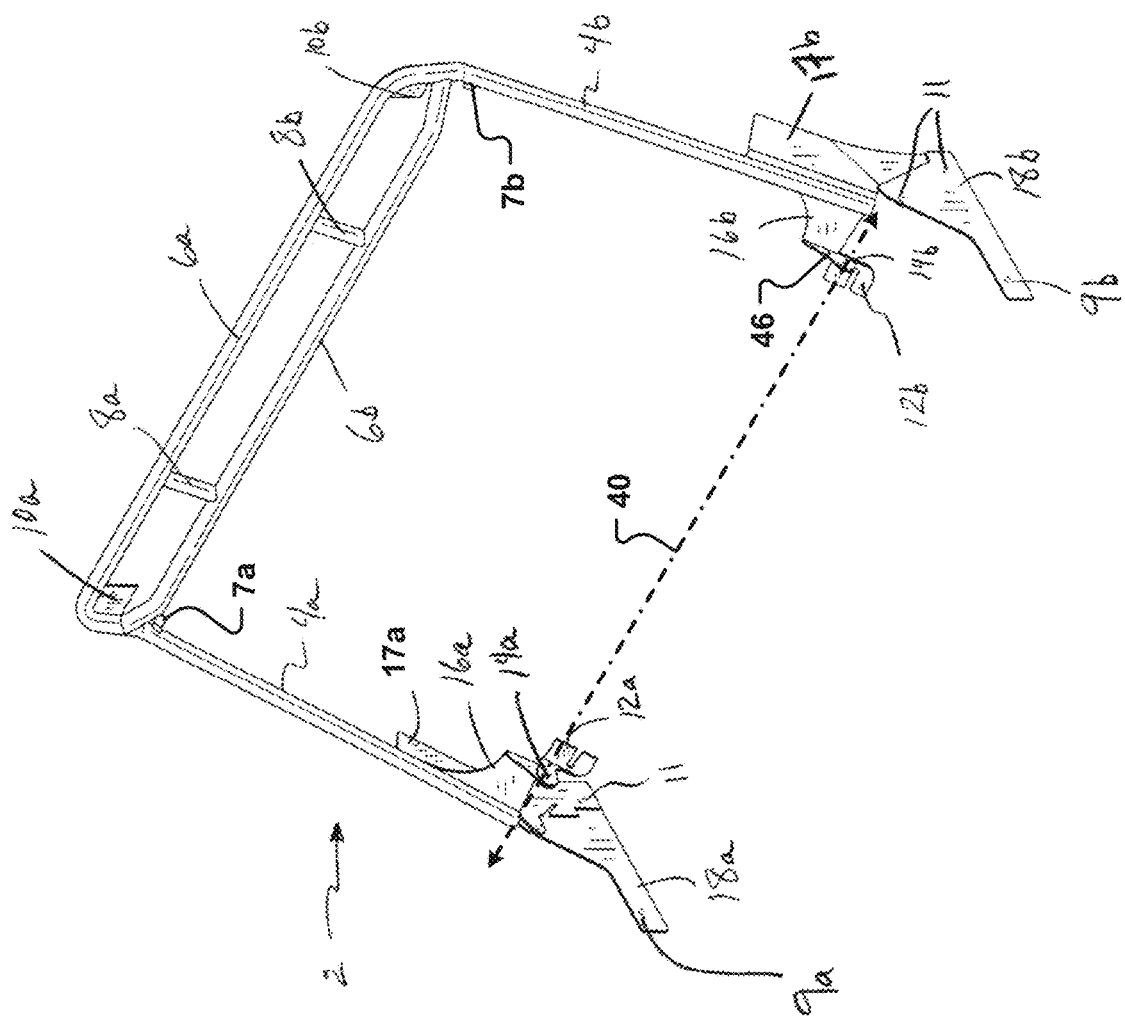

FIG. 1 is a front perspective view of a rack member for a vehicle according to one embodiment of the present disclosure, the rack member configured to be rotatably interconnected to a front portion of the vehicle.

Figure 2:
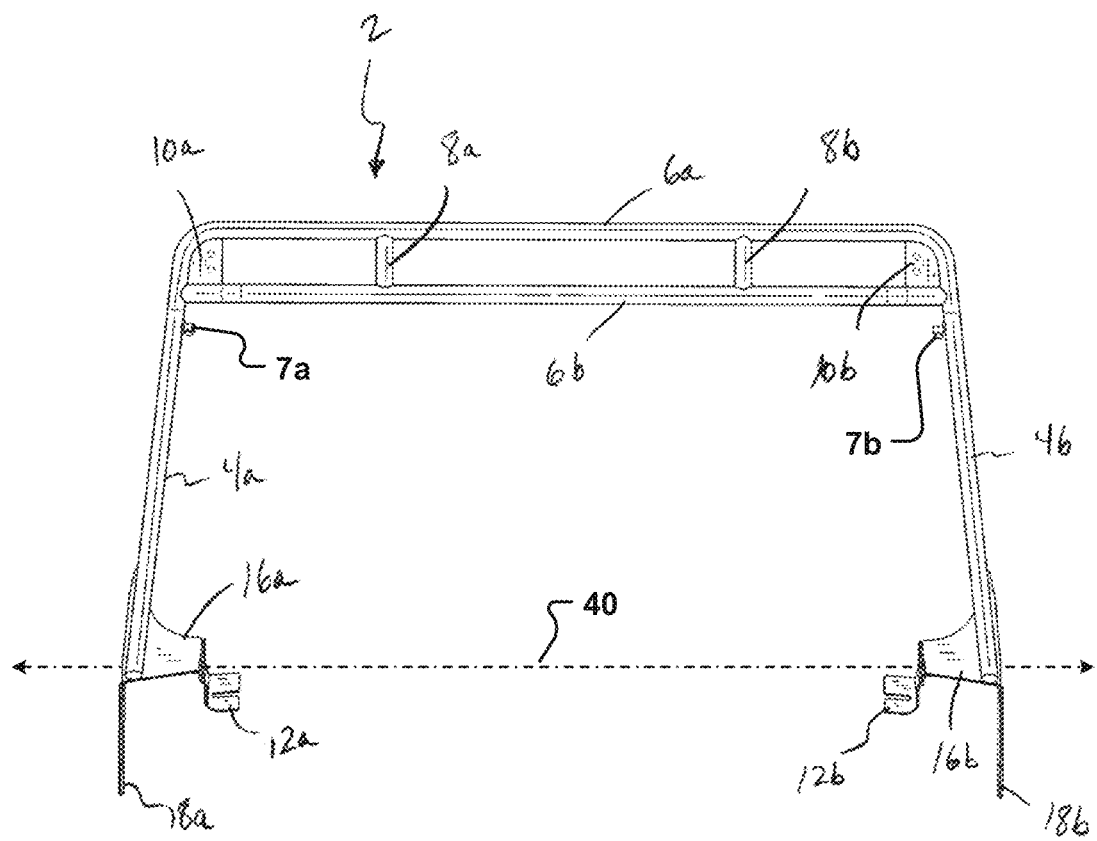

FIG. 2 is a front elevation view of the rack member according to the embodiment of FIG. 1.

Figure 3:
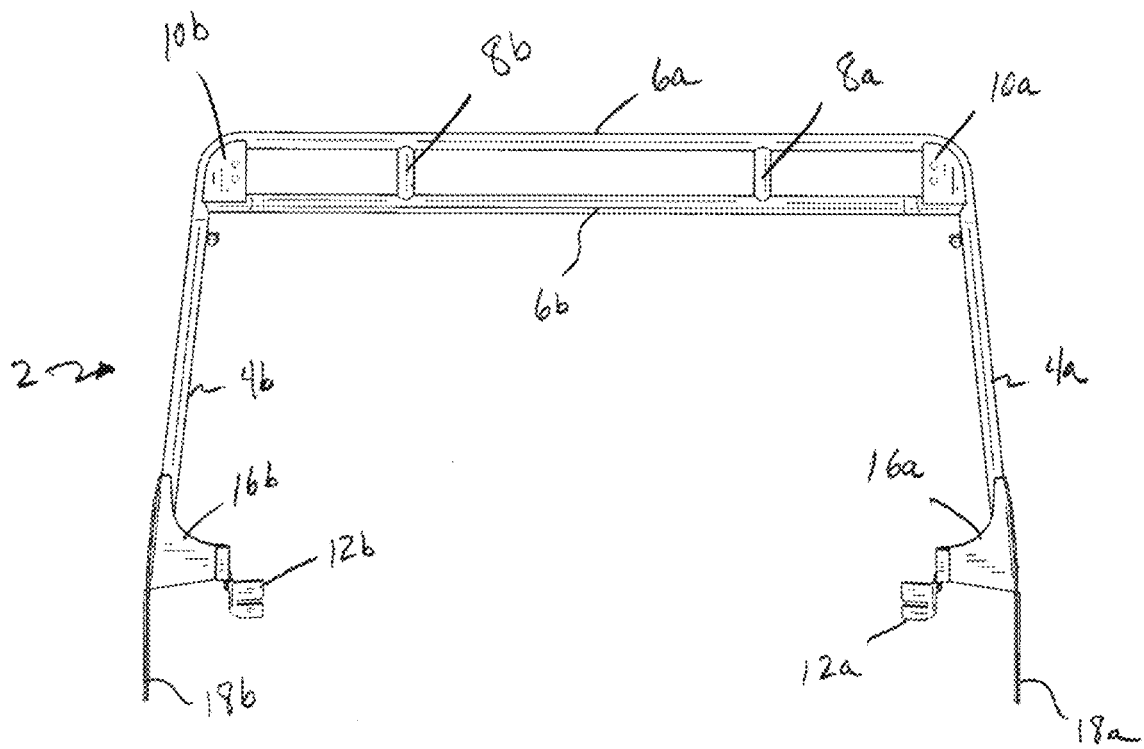

FIG. 3 is a rear elevation view of the rack member according to the embodiment of FIG. 1.

Figure 4:
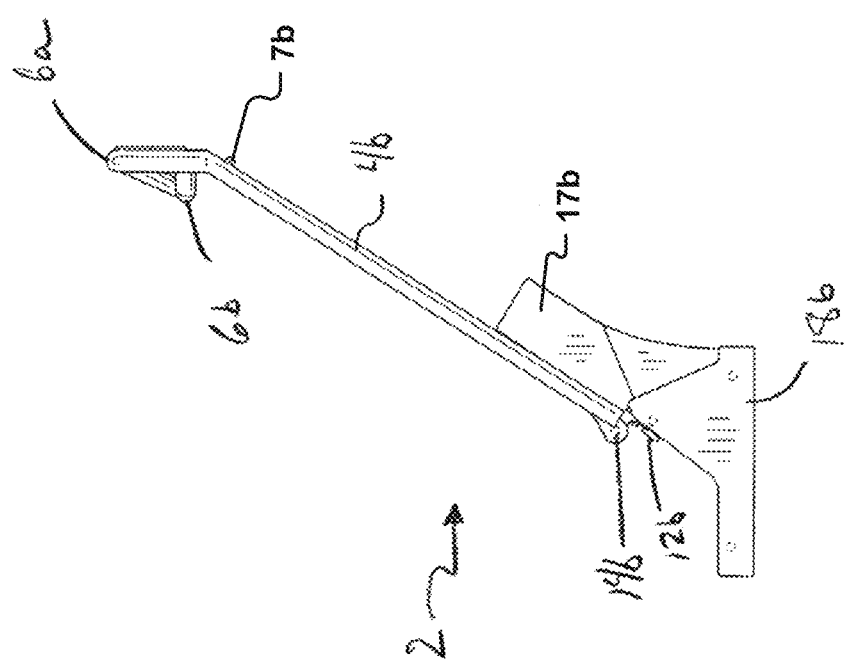

FIG. 4 is a right elevation view of the rack member according to the embodiment of FIG. 1.

Figure 5:
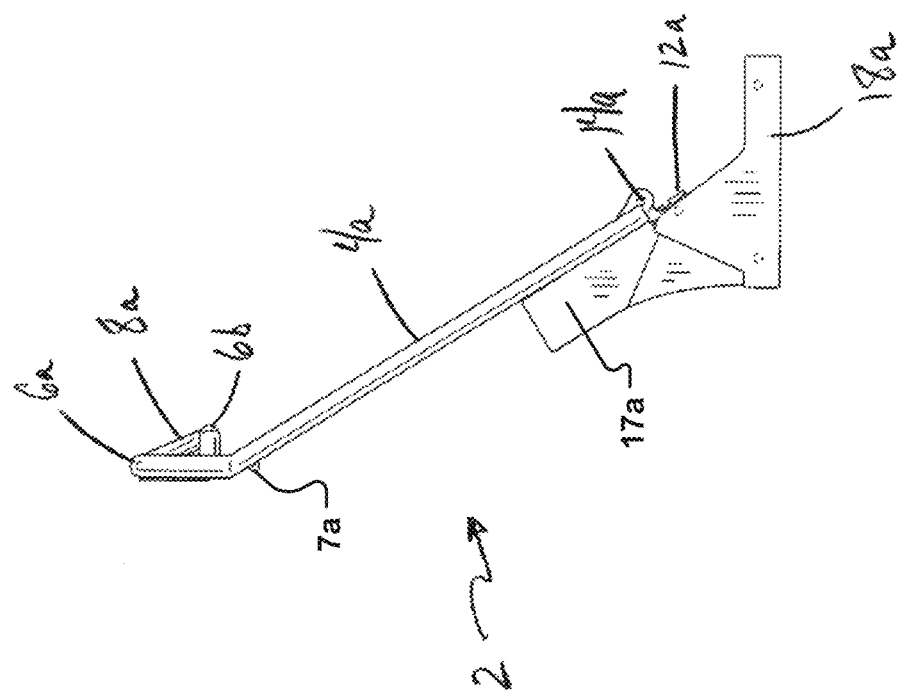

FIG. 5 is a left elevation view of the rack member according to the embodiment of FIG. 1.

Figure 6:
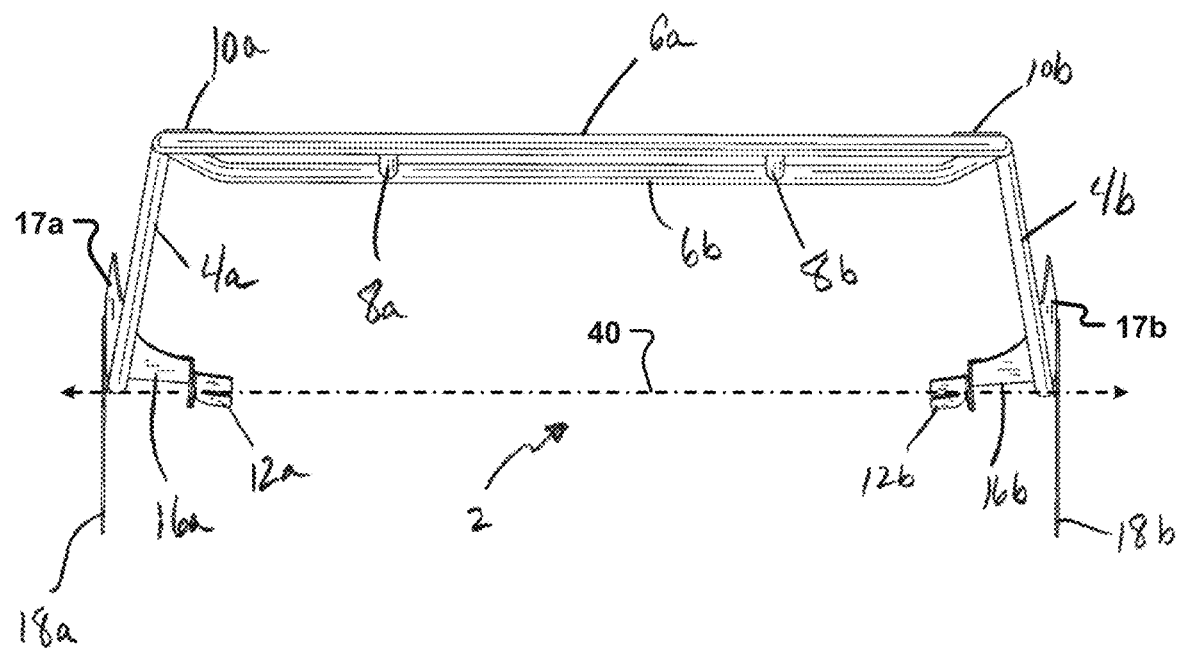

FIG. 6 is a top plan view of the rack member according to the embodiment of FIG. 1.

Figure 7:
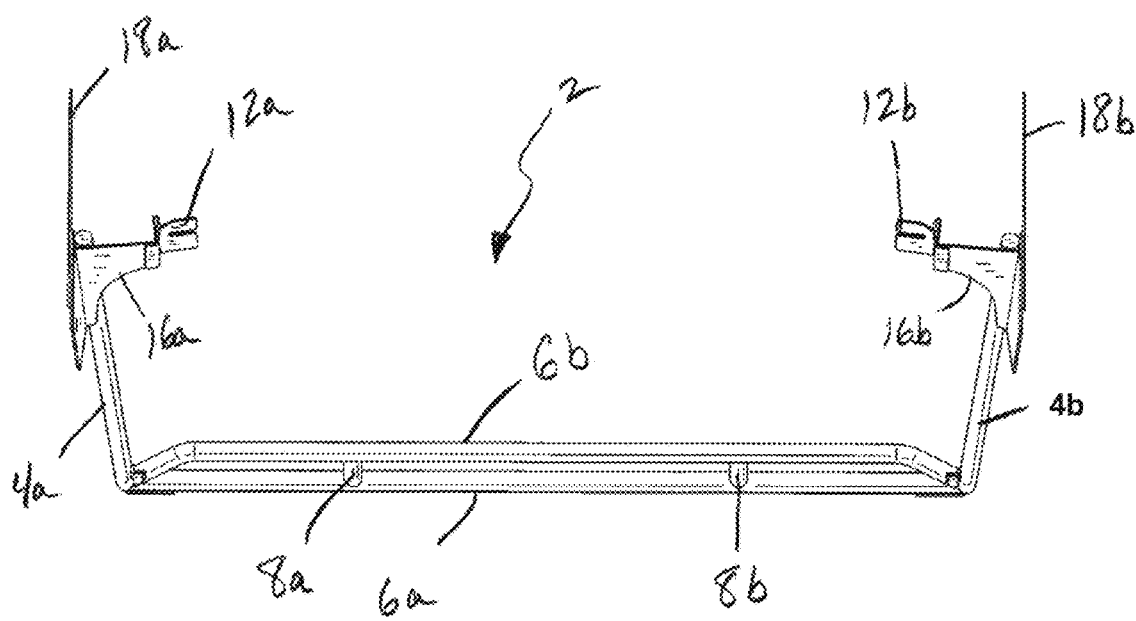

FIG. 7 is a bottom plan view of the rack member according to the embodiment of FIG. 1.

Figure 8:
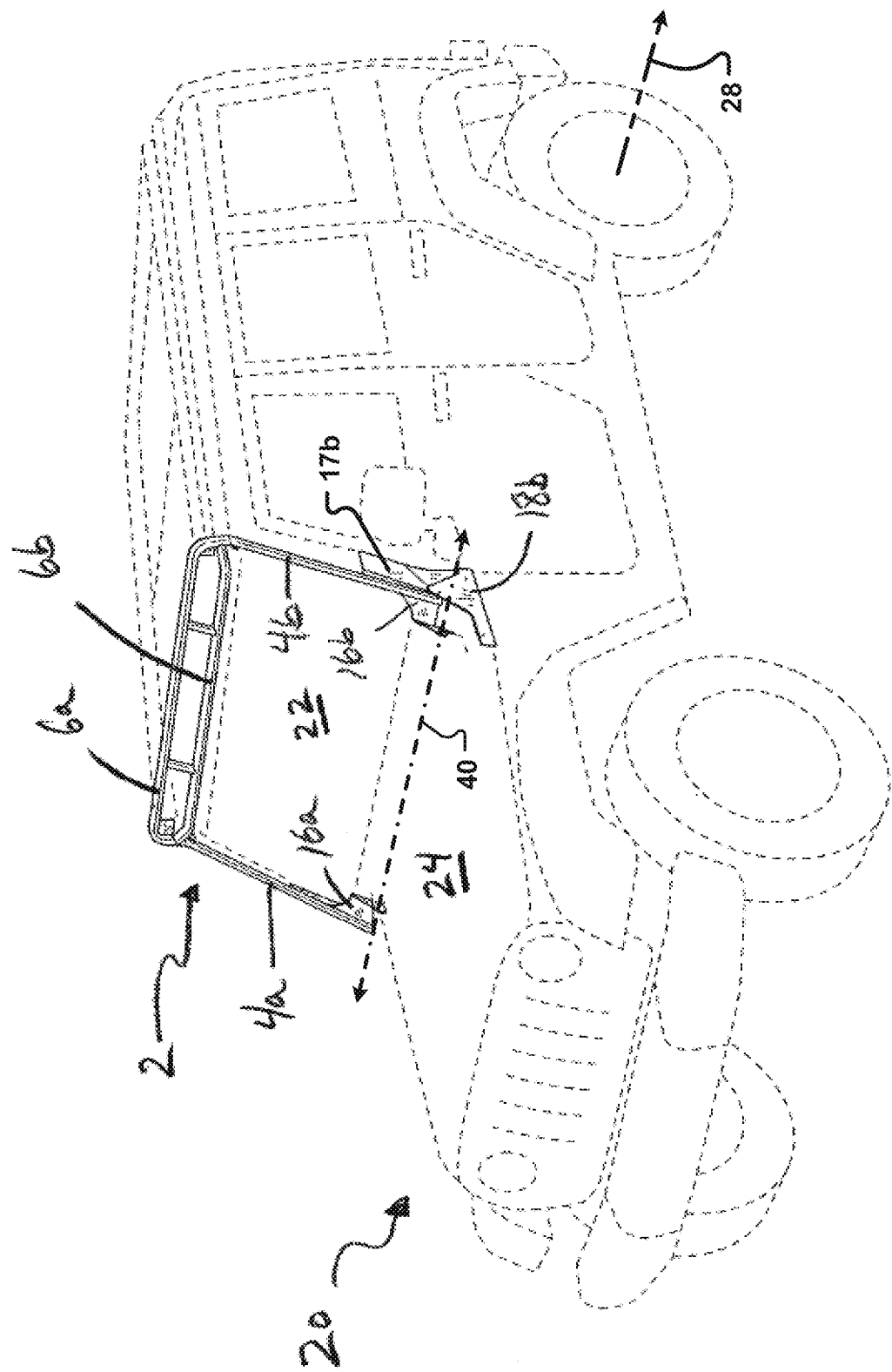

FIG. 8 is a perspective view of the rack member of the embodiment of FIG. 1 provided in combination with a vehicle.

Figure 9:
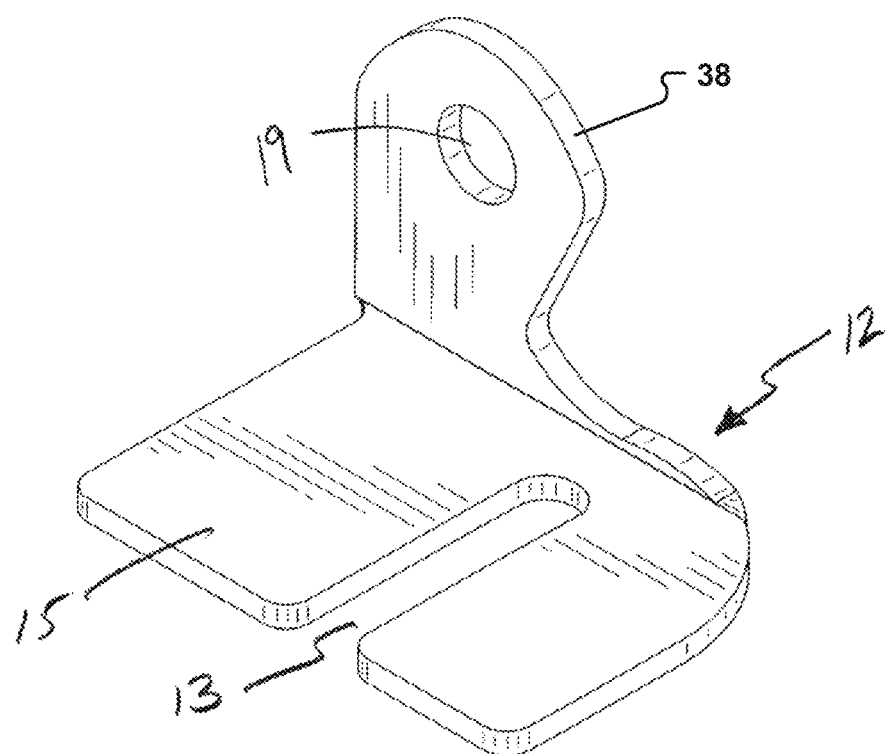

FIG. 9 is a perspective view of a bracket member of a rack member according to an embodiment of the present disclosure.

Figure 10:
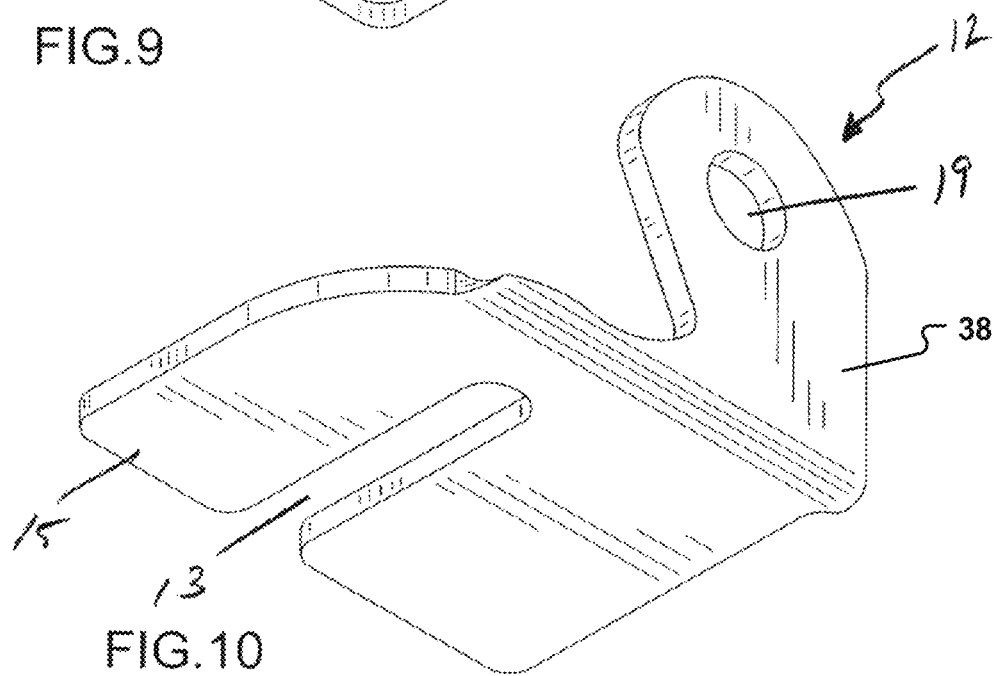

FIG. 10 is a bottom perspective view of the bracket member according to the embodiment of FIG. 9.

Figure 11:
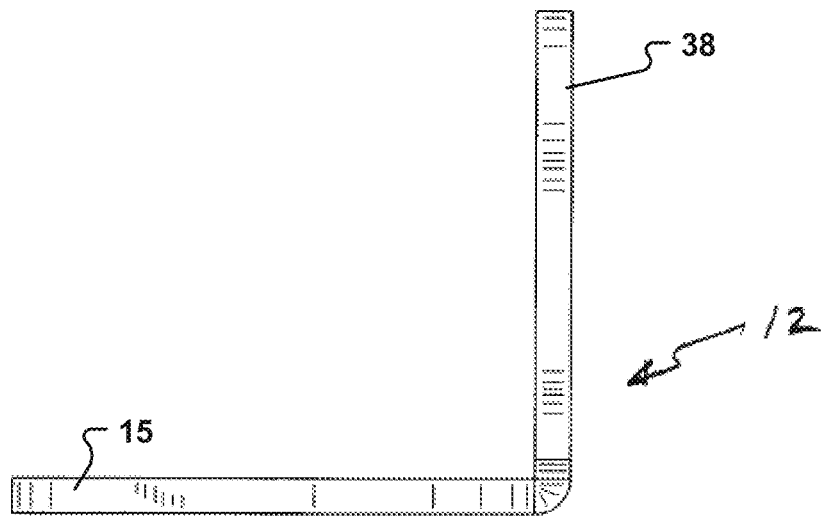

FIG. 11 is a front elevation view of the bracket member according to the embodiment of FIG. 9.

Figure 12:
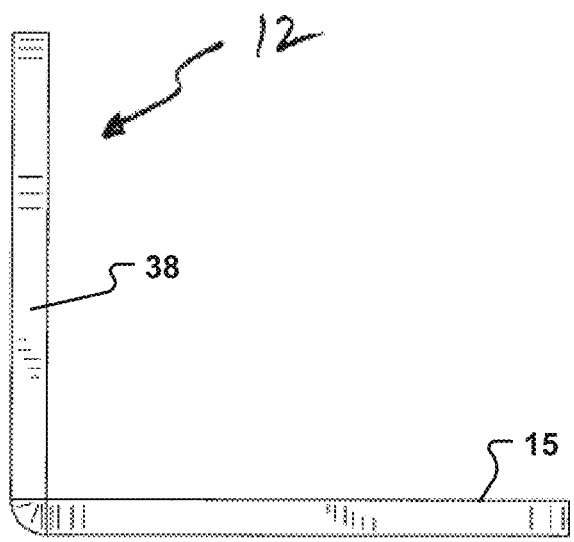

FIG. 12 is a rear elevation view of the bracket member according to the embodiment of FIG. 9.

Figure 13:
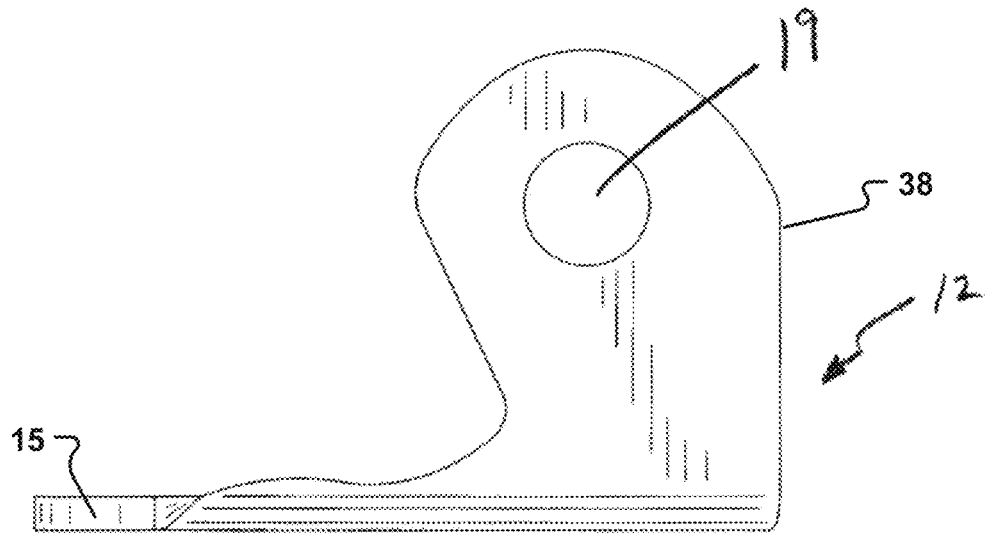

FIG. 13 is a right elevation view of the bracket member according to the embodiment of FIG. 9.

Figure 14:
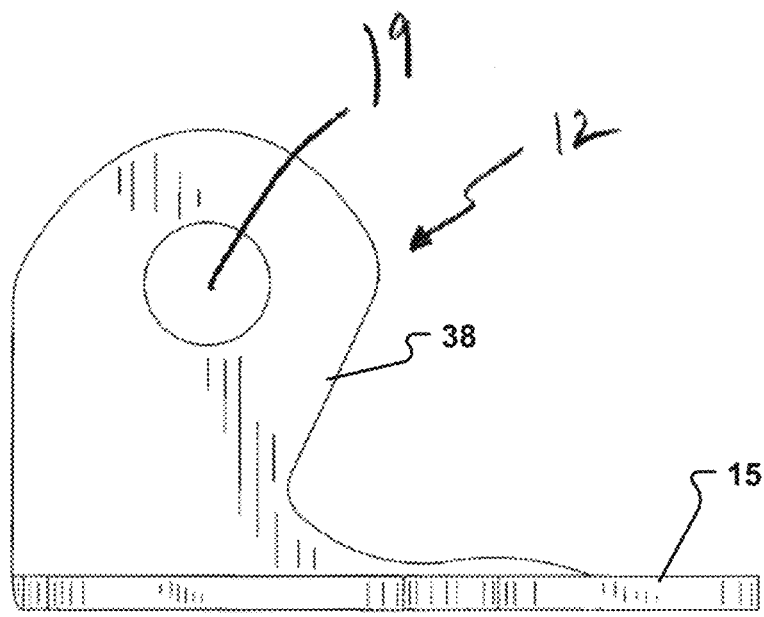

FIG. 14 is a left elevation view of the bracket member according to the embodiment of FIG. 9.

Figure 15:
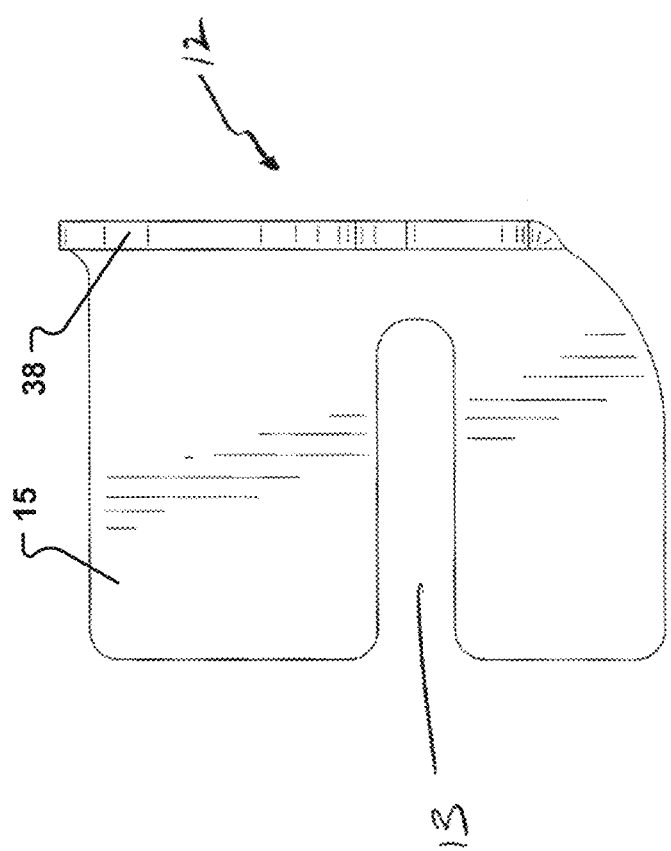

FIG. 15 is a top plan view of the bracket member according to the embodiment of FIG. 9.

Figure 16:
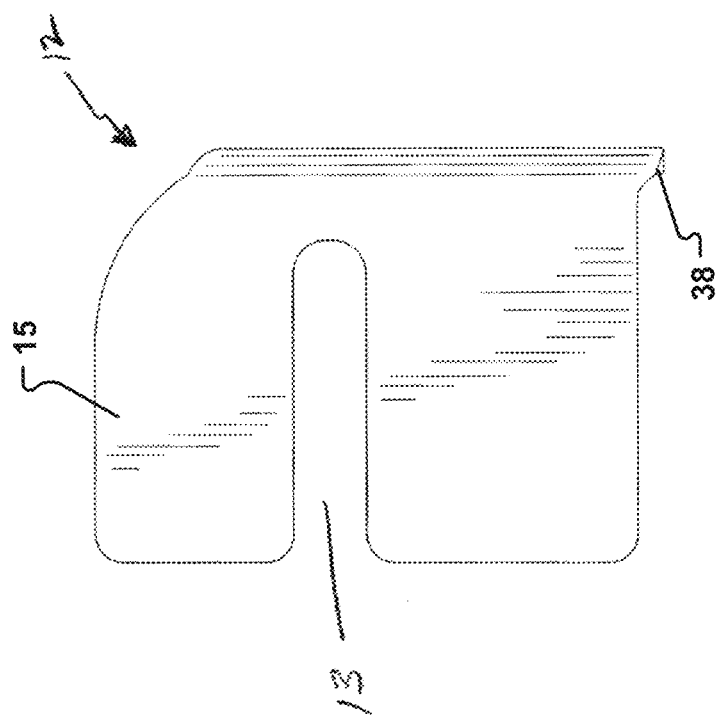

FIG. 16 is a bottom plan view of the bracket member according to the embodiment of FIG. 9.

Figure 17:
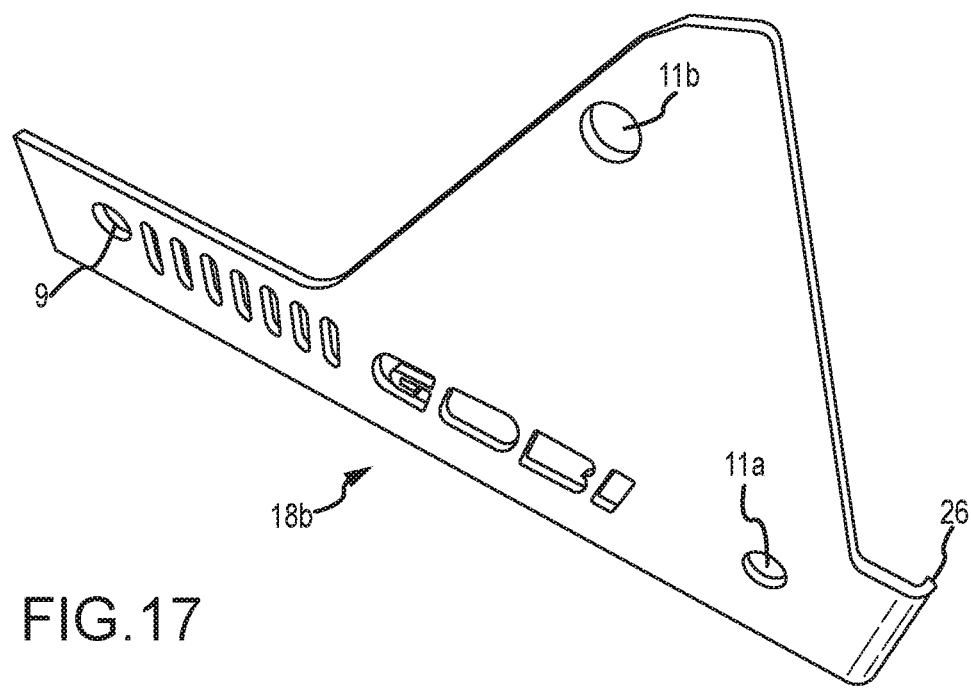

FIG. 17 is a perspective view of a mounting bracket of the rack member according to one embodiment of the present disclosure.

Figure 18:
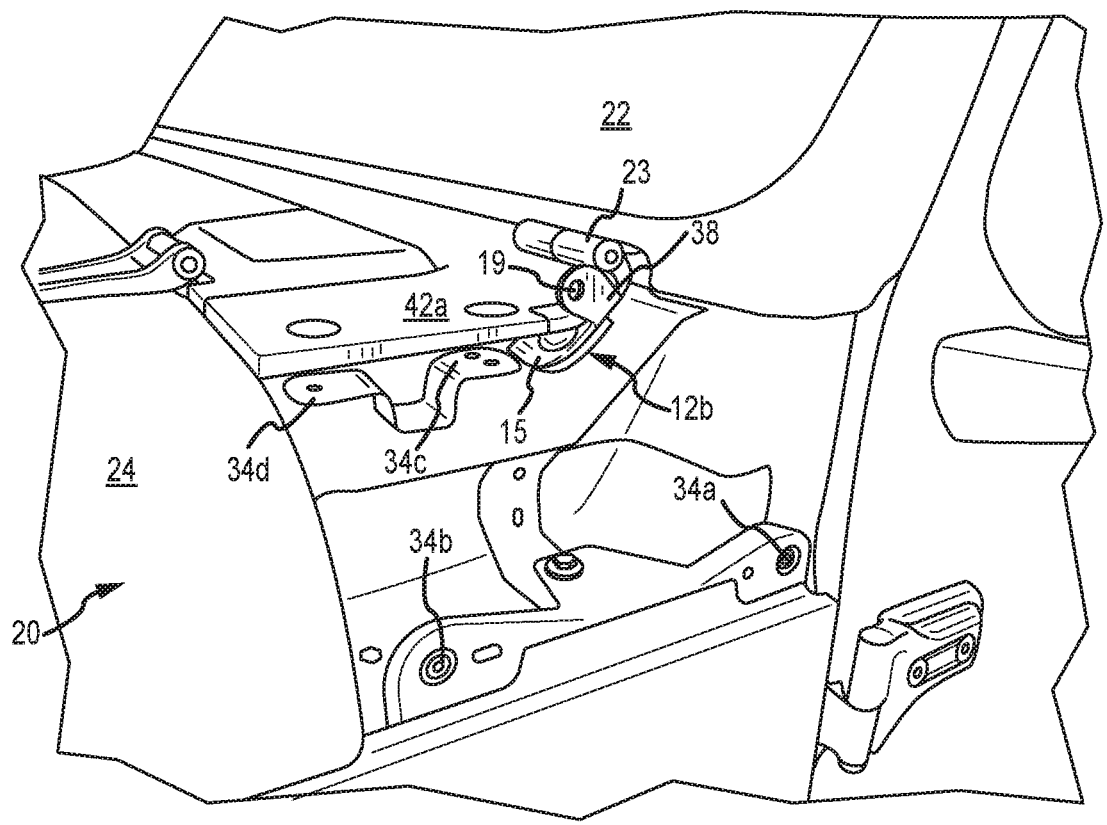

FIG. 18 is a perspective view of a bracket member according to one embodiment of the present disclosure and illustrating a portion of the vehicle with some of the cowling removed to facilitate interconnect of the bracket member to a vehicle.

Figure 19:
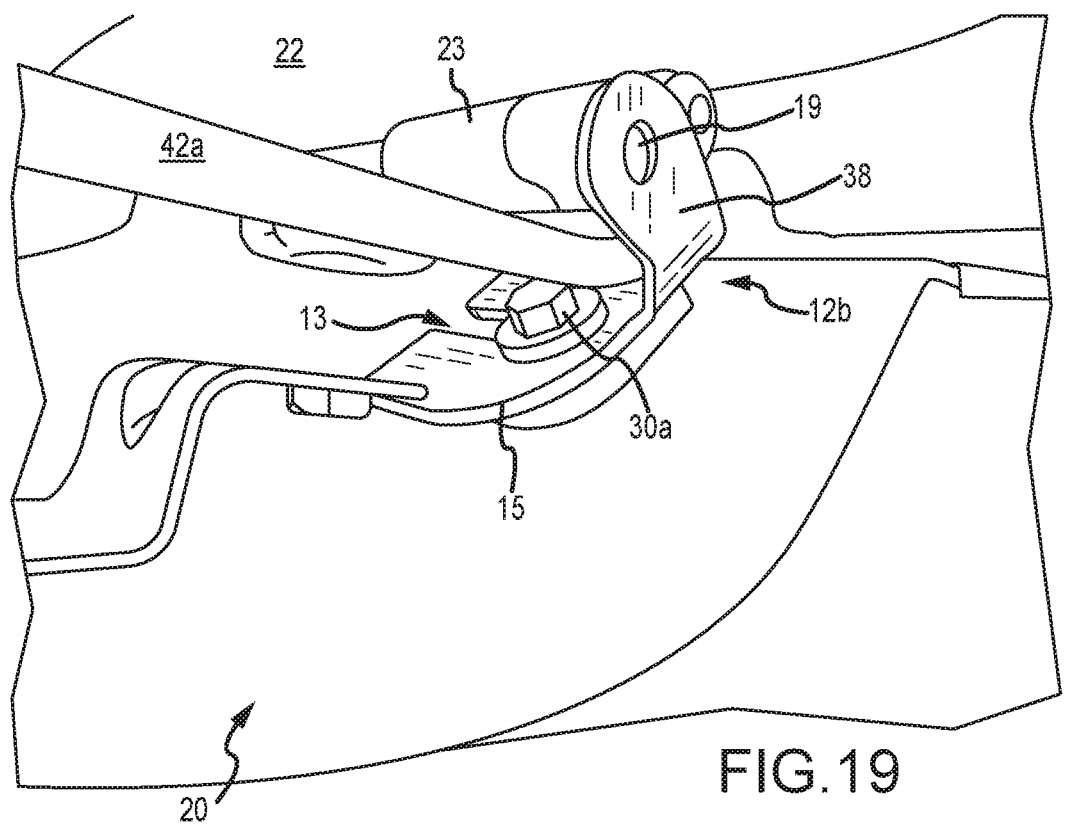

FIG. 19 is an expanded perspective view of the bracket member of the embodiment of FIG. 18 interconnected to the vehicle.

Figure 20:
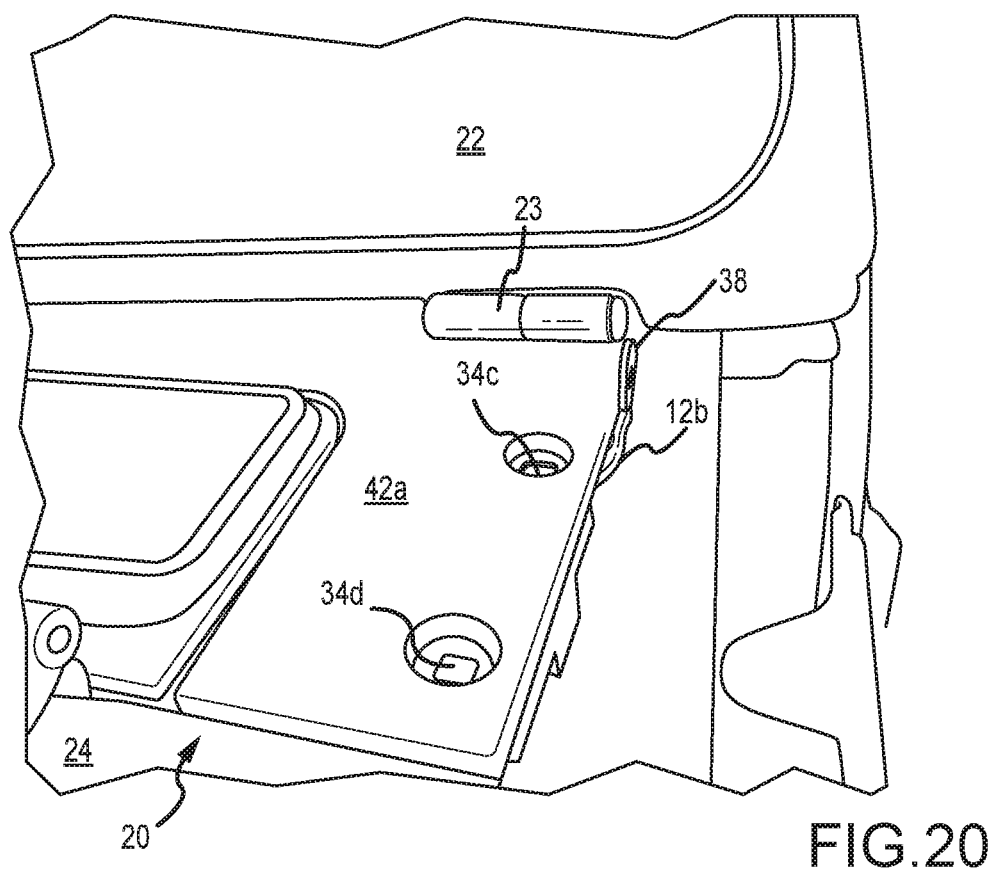

FIG. 20 is yet another perspective view of the bracket member of FIG. 18 interconnected to the vehicle.

Figure 21A:
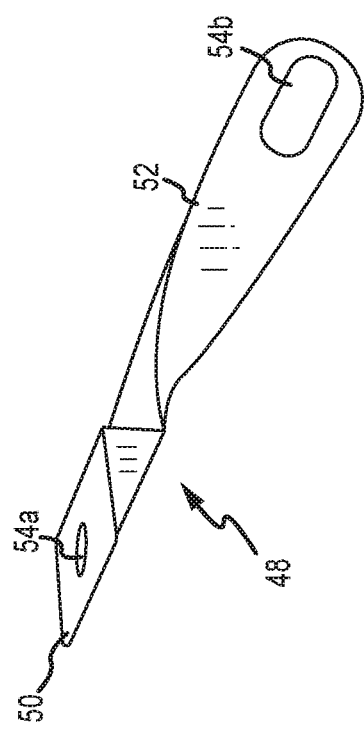

FIG. 21A is a perspective view of a support strap of one embodiment of the present disclosure.

Figure 21C:
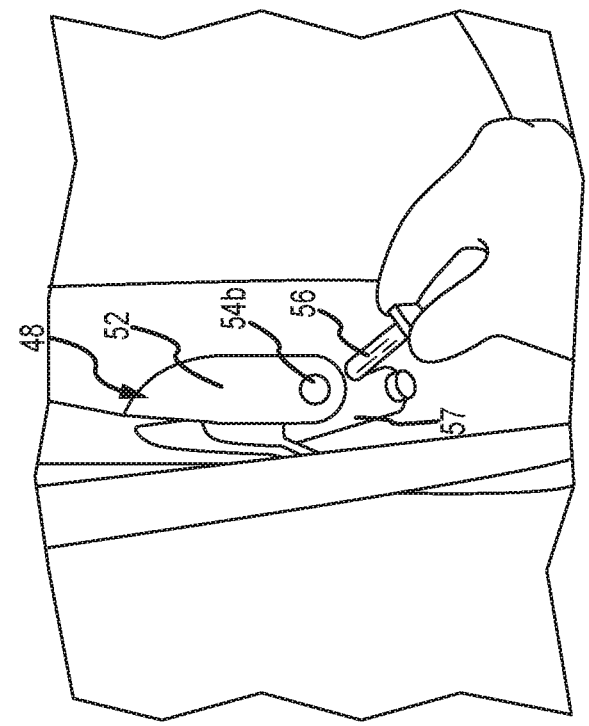
Figure 21B:
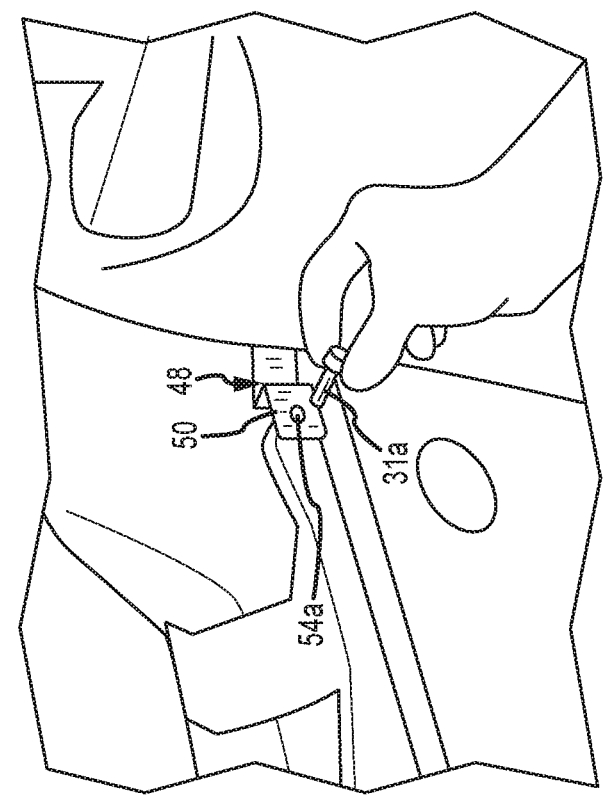

FIG. 21B is a perspective view illustrating interconnection of the support strap of FIG. 21A to a vehicle.

FIG. 21C is another perspective view illustrating interconnection of the support strap of FIG. 21A to a vehicle proximate to a hinge of a door of the vehicle.

FIG. 22 is a perspective view illustrating a portion of the bracket member extending above the cowling portion which has been reinstalled on the vehicle of FIG. 20.

Figure 23:
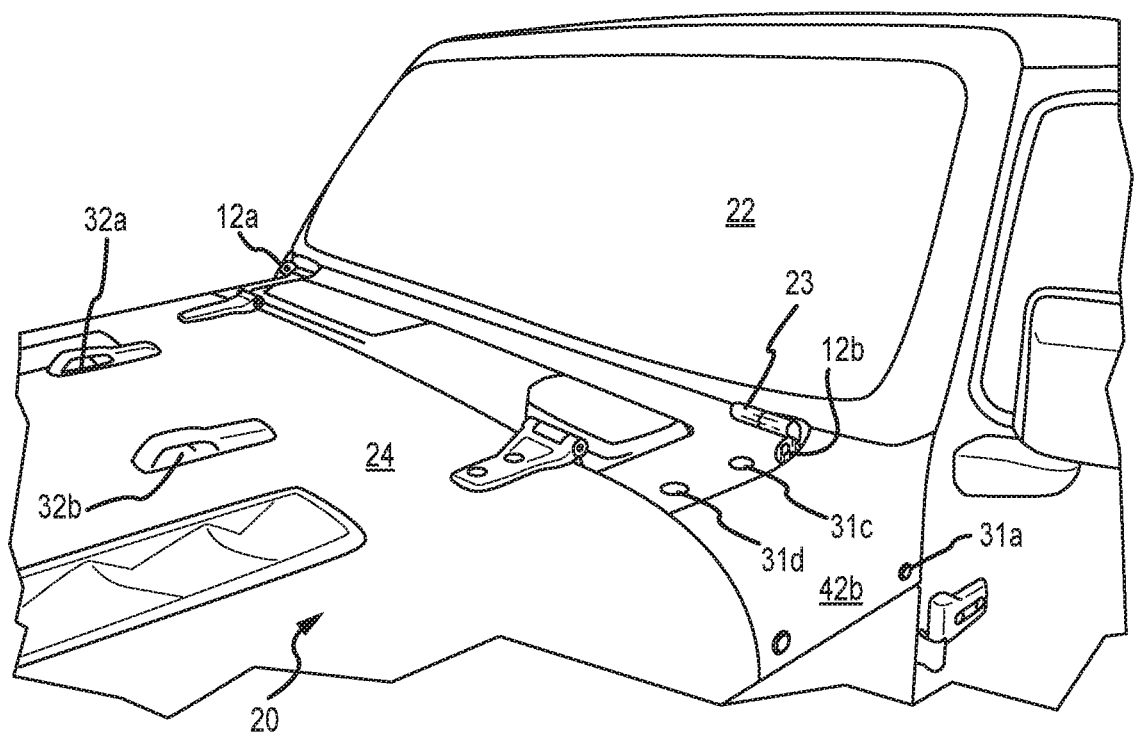

FIG. 23 is a perspective view showing two bracket members affixed to the vehicle of FIG. 18.

Figure 24:
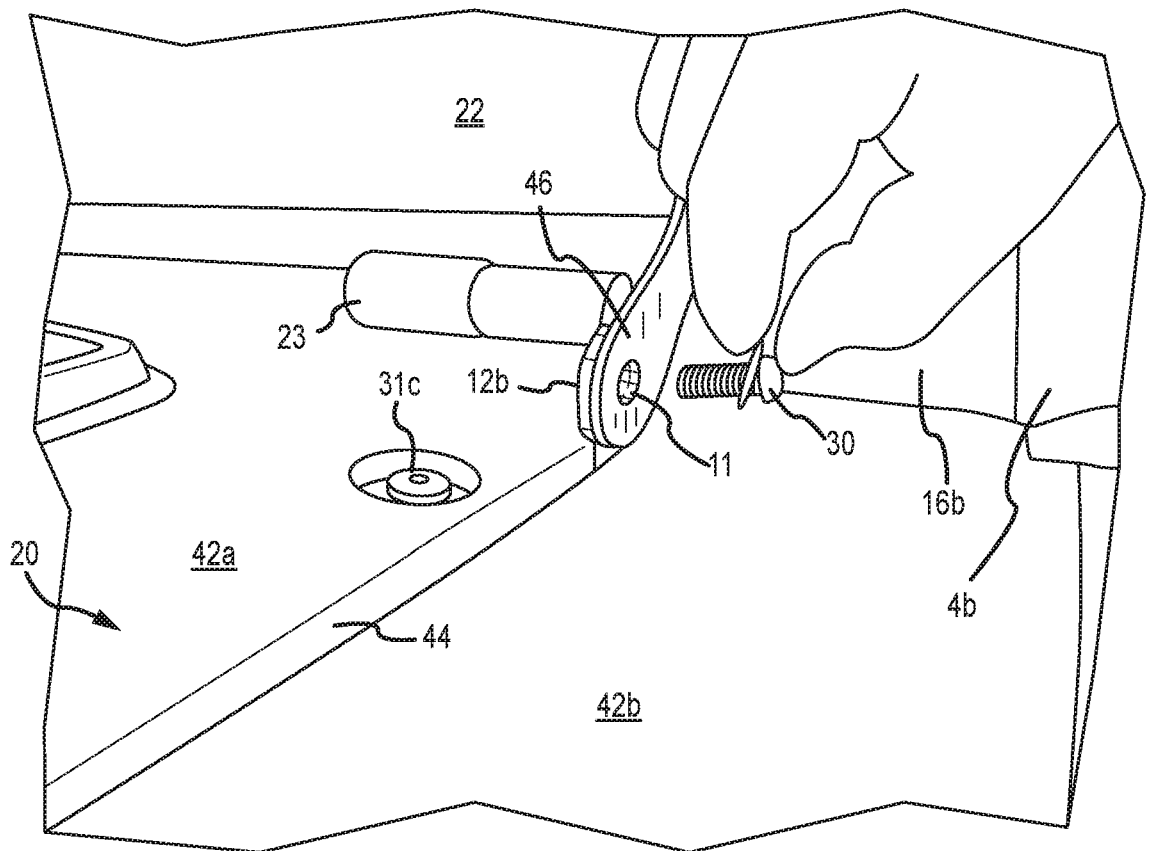

FIG. 24 is yet another perspective view generally illustrating the rack member being pivotally interconnected to a bracket member affixed to a vehicle.

Figure 25:
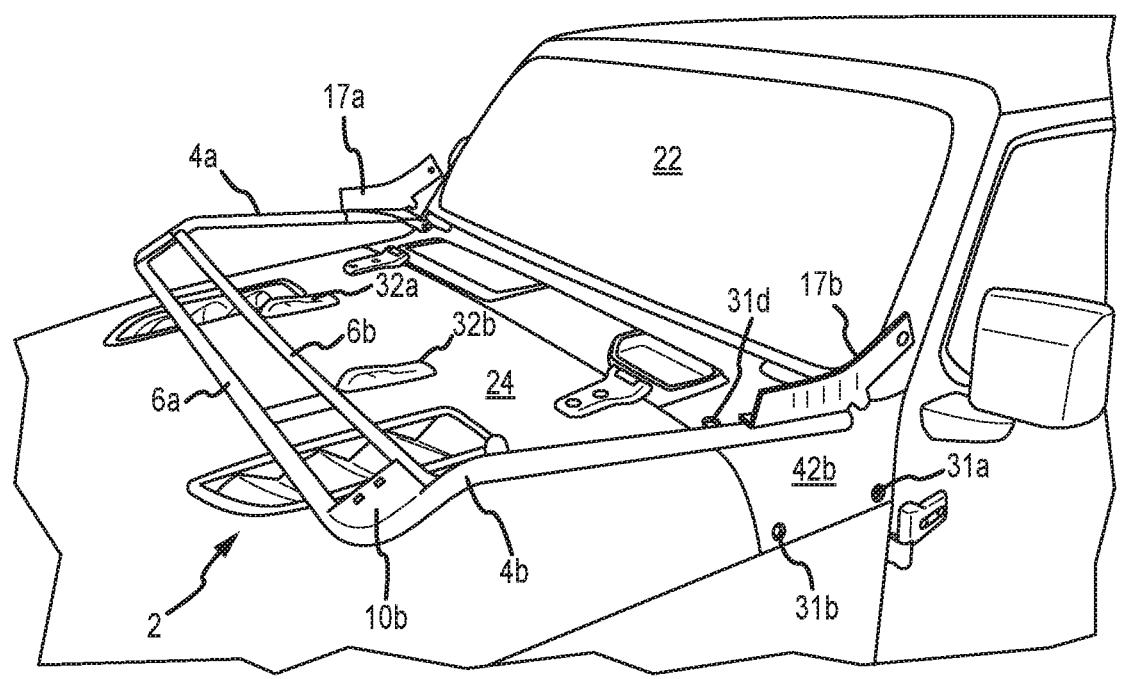

FIG. 25 is a front perspective view of the vehicle of FIG. 24 showing the rack member of the present disclosure pivotally affixed to the bracket members and illustrating the rack member in a second position of use proximate to the vehicle hood.

Figure 26:
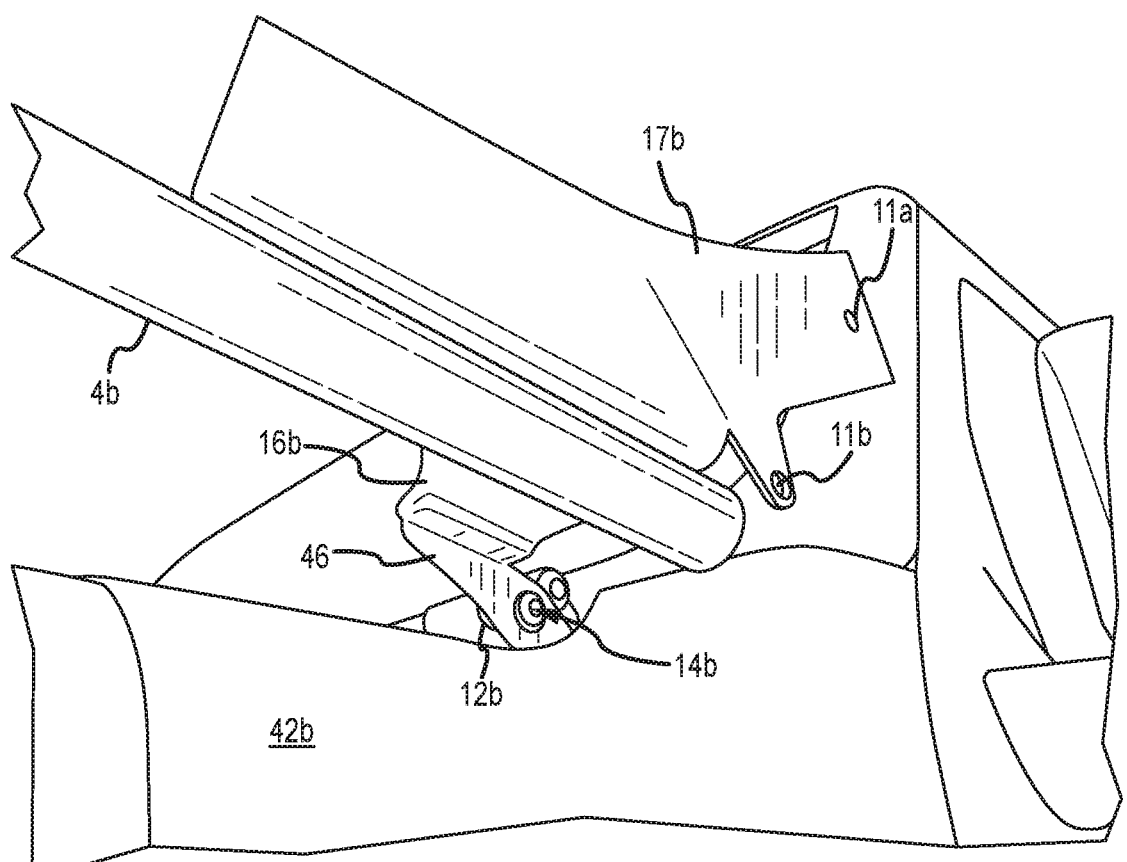

FIG. 26 is another perspective view of the vehicle and the rack member of FIG. 25.

Figure 27:
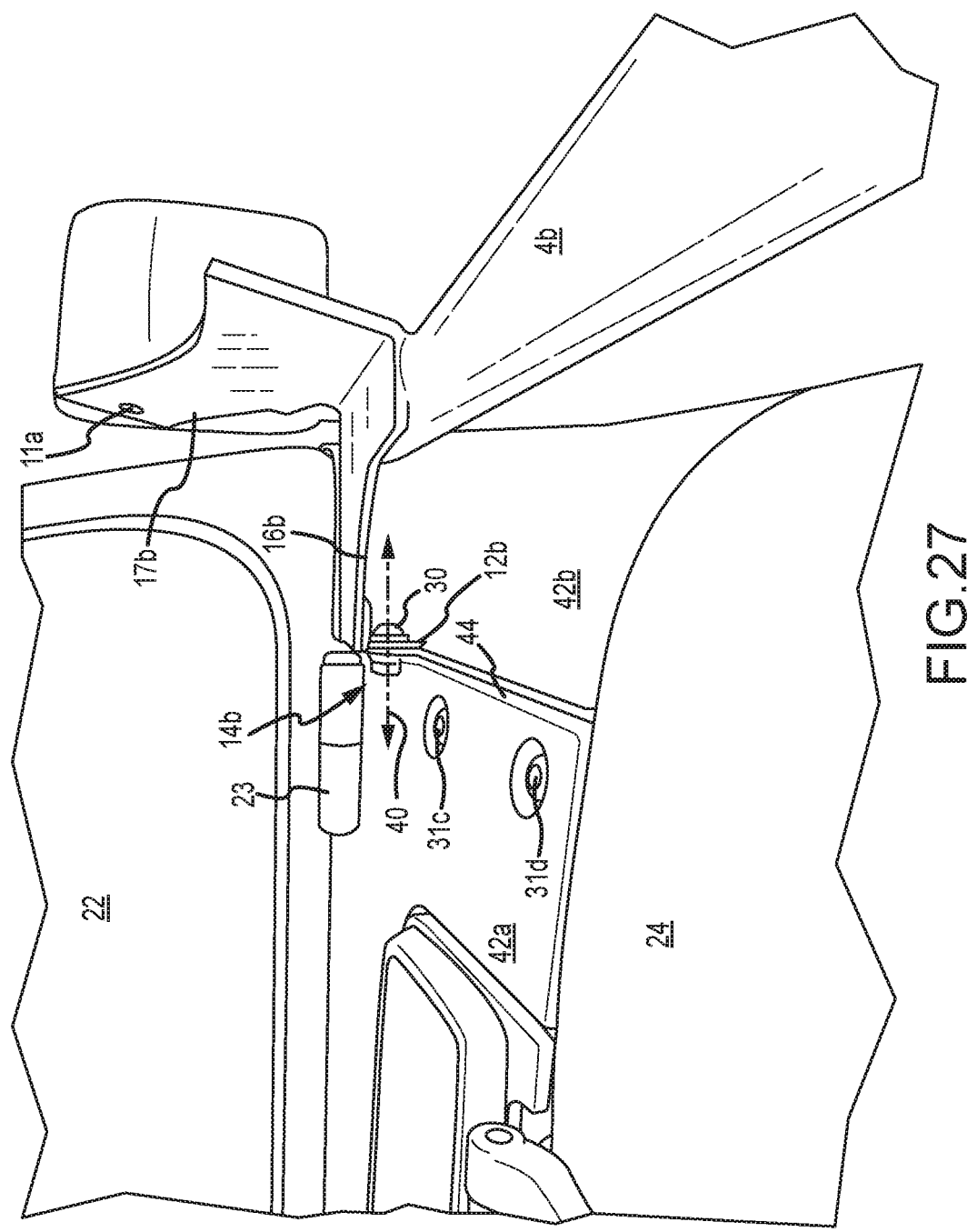

FIG. 27 is yet another perspective view of the vehicle and the rack member of FIG. 26.

Figure 28:
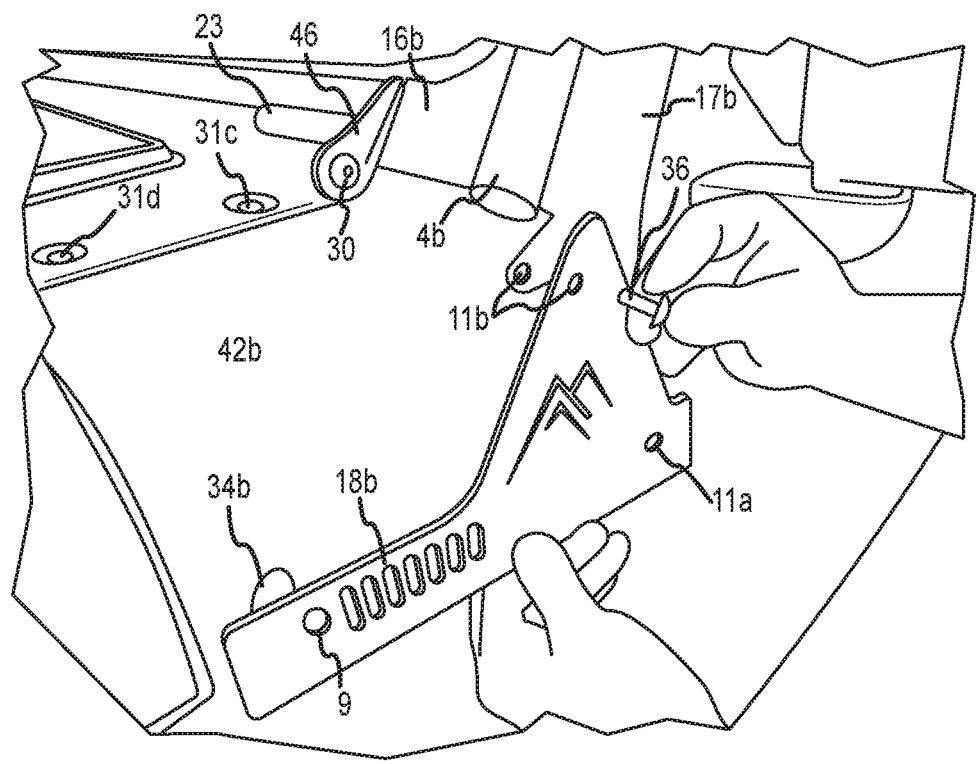
Figure 29:
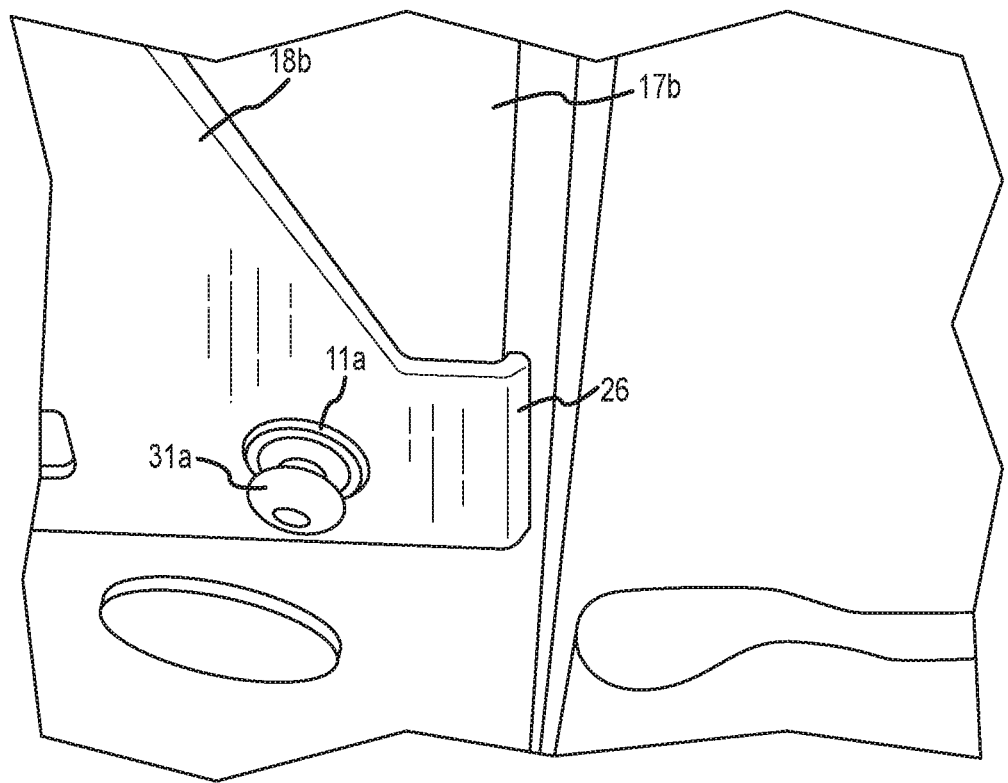

FIGS. 28-29 are perspective views illustrating installation of a mounting bracket to the rack member and the vehicle of FIG. 27.

Figure 30:
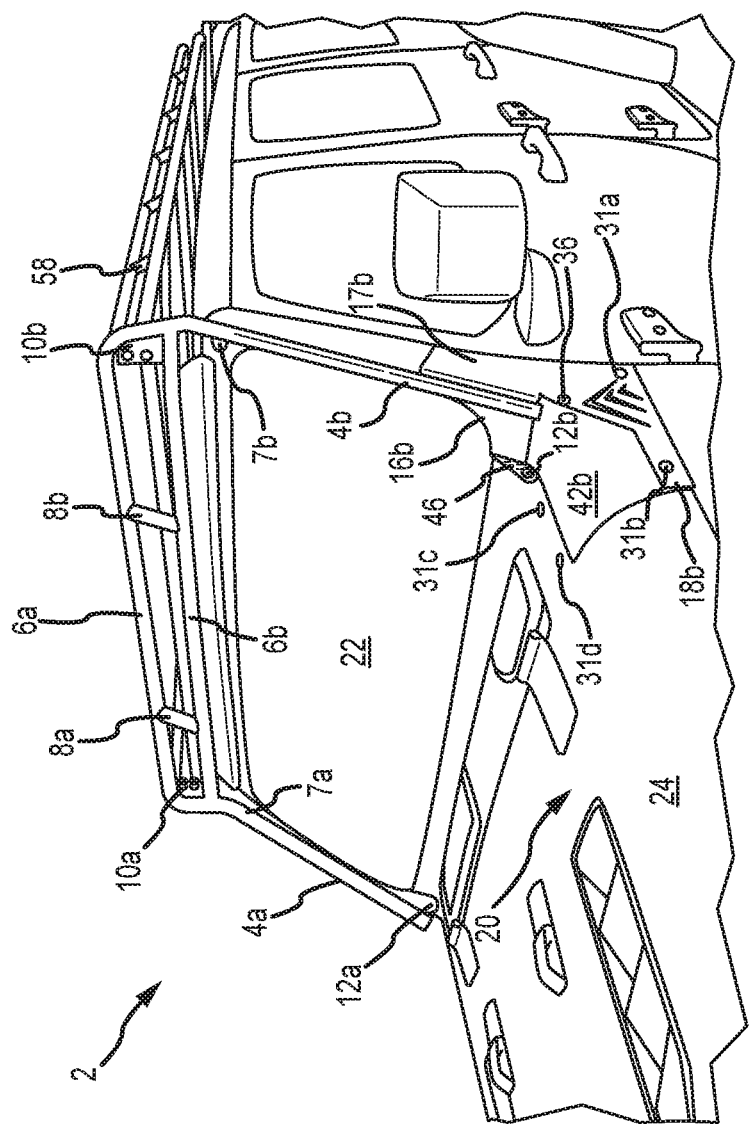

FIG. 30 is a perspective view of a rack member installed on a vehicle according to one embodiment of the present disclosure and illustrating a roof rack interconnected to the rack member.

Similar components and/or features may have the same reference number. Components of the same type may be distinguished by a letter following the reference number. If only the reference number is used, the description is applicable to any one of the similar components having the same reference number.

To assist in the understanding of the present invention the following list of components and associated numbering found in the drawings is provided herein:

| Number | Component |
|---|---|
| 2 | Rack member |
| 4a | First support member |
| 4b | Second support member |
| 6a | First horizontal support |
| 6b | Second horizontal support |
| 7 | Contact member |
| 8 | Stabilizing members |
| 9 | Aperture |
| 10 | Attachment plates |
| 11 | Aperture |
| 12 | Bracket members |
| 13 | Slot of bracket member |
| 14 | Pivot points |
| 15 | Clamp plate portion of bracket member |
| 16 | Support member |
| 17 | Support member |
| 18 | Mounting brackets |
| 19 | Eyelet (or through-hole) of bracket member |
| 20 | Vehicle |
| 22 | Windshield |
| 23 | Hinge associated with vehicle windshield |
| 24 | Hood |
| 26 | Catch of mounting bracket |
| 28 | Wheel axis of the vehicle |
| 30 | Fastener or Bolt |
| 31 | Cowling fastener |
| 32 | Support pads of vehicle hood |
| 34 | Cowling aperture |
| 36 | Fastener |
| 38 | Transverse portion of a bracket member |
| 40 | Pivot Axis of rotation (or pivot axis of the bracket members) |
| 42 | Cowling or exterior trim member of the vehicle |
| 44 | Gap between trim members |
| 46 | Flange of support member |
| 48 | Support strap |
| 50 | First portion of strap |
| 52 | Second portion of strap |
| 54 | Apertures |
| 56 | Hinge bolt |
| 57 | Door hinge |
| 58 | Roof rack |

DETAILED DESCRIPTION

As shown in FIGS. 1-8, a rack member 2 for a vehicle 20 is provided. The rack member 2 comprises first and second 4a, 4b support members that are operable and intended to extend along a windshield 22 of a vehicle 20 (for example). An upper portion of the rack member 2 comprises first and second supports 6a, 6b. The supports 6 are configured to be generally horizontal when the rack member 2 is interconnected to a vehicle as generally illustrated in FIG. 8. Stabilizing members 8a, 8b can optionally be provided. The stabilizing members 8 are generally interconnected to the supports 6. Although two stabilizing members 8a, 8b are provided, it will be recognized that any number of stabilizing members can be provided, including no stabilizing members. Additionally, or alternatively, attachment plates 10a, 10b can provided to selectively secure the rack member 2 to additional rack features or to a roof rack 58.

The rack member 2 can optionally include contact members 7. In one embodiment, the contact members 7 are configured to engage the vehicle proximate to the windshield 22. The contact members 7 can comprise a soft or elastomeric material, such as a rubber or a plastic. In operation, after the rack member 2 is interconnected to the vehicle in the first position of use, the contact members abut the vehicle and prevent marring or scratching by the rack member. Optionally, the contact members 7 can be compressible or resiliently-deflectable.

A lower portion of the rack member 2 is connectable to a vehicle 20 proximal to a vehicle's hood 24 and/or cowling 42. The rack member 2 comprises first and second bracket members 12a, 12b that can be pivotally connected to the rack member 2. The bracket members 12a, 12b are selectively securable to preexisting components of a vehicle 20. Accordingly, in one embodiment, the rack member 2 can be interconnected to the vehicle without drilling or cutting the vehicle.

The bracket members 12 are preferably configured to extend at least partially above the hood 24 of the vehicle and provide a point of interconnection for additional rack member components. The bracket members 12a, 12b further provide pivot points 14a, 14b which define a pivot axis 40 proximal to and above the hood 24. In this manner, the rack member 2 can be attached to the bracket members 12 in a rotatable manner. More specifically, the bracket members 12 can include an eyelet or through-hole 19 (illustrated in FIG. 9) configured to receive a fastener (such as a bolt 30 illustrated in FIGS. 24 and 27) which defines the pivot point 14 and pivot axis 40.

Support members 16a, 16b, 17a, 17b extend from the support members 4a, 4b and provide structural support to the rack member 2. The support members 16 are adapted to be interconnected to the bracket members 12. The first support member 16a can extend from the first support member 4a inwardly toward the second support member 16b.

An upper edge of the support members 16 can have an arcuate shape. Optionally, the upper edge has a shape similar to bottom corners of a windshield 22. In this manner, the rack member 2 can minimize visual obstructions to a driver of the vehicle 20.

In one embodiment, a flange 46 (best seen in FIG. 24) extends from each of the support members 16. The flange 46 is adapted to interconnect the rack member 2 to the bracket members 12. Optionally, the flanges 46 are approximately parallel. In one embodiment the flange can have an aperture 11 for a fastener 30 to interconnect the flange 46 to a bracket member 12 such as generally illustrated in FIG. 24. Alternatively, the flange 46 can include a bolt that can extend through the through-hole 19 of a bracket member 12.

The support members 17 can be oriented approximately perpendicular to the support member 16. In one embodiment, support members 16, 17 are formed of a single piece of material such as generally illustrated in FIG. 27. Alternatively, the support members 16, 17 are separately formed. The support members 17 generally extend rearwardly away from the support members 4. Optionally, the support members 17a, 17b are approximately parallel. The support members may include apertures 11 (illustrated in FIG. 26) to secure the support members 17 to the vehicle.

Mounting brackets 18a, 18b are provided on either side of the rack member 2. The mounting brackets 18 can be secured to the rack member 2 by one or more fasteners, such as screws or bolts. For example, the mounting brackets 18 can include two or more apertures 11 to receive fasteners. As generally illustrated in FIG. 28-30, the apertures 9, 11a of the mounting brackets 18 can receive fasteners 31 to selectively secure the brackets 18 to a vehicle 20. Optionally, aperture 9 can receive a fastener 31b to secure the mounting bracket 18 directly to the vehicle, as generally illustrated in FIG. 30. The mounting brackets 18a, 18b of the depicted embodiments are operable to extend along a side portion or quarter panel of a vehicle 20.

Each mounting bracket 18 can be affixed to one of the support members 17. Apertures 11b through the mounting bracket 18 can receive a fastener 36 that extends through a corresponding aperture 11b of a support member 17, such as generally illustrated in FIG. 28.

In one embodiment, illustrated in FIG. 17, the mounting brackets 18 can include a hook or catch 26. The catch 26 may be proximate to an edge of the mounting bracket 18 and extend transverse to a plane defined by the mounting bracket. Referring now to FIG. 29, when the mounting bracket 18 is interconnected to the vehicle 20, the catch 26 can engage a rearward edge of the support bracket 17. In this manner, the catch 26 can prevent (or reduce) inadvertent or unintended movement of the rack member 2. In one embodiment, the catch 26 has a length extending from the mounting bracket 18 that is less than the thickness of support bracket 17. Accordingly, the catch 26 can be spaced from the vehicle when the mounting bracket is affixed to the vehicle.

Although certain embodiments of the present disclosure provide an axis of rotation 40 or hinge point 14 for the rack member 2 being provided at or through the bracket members 12 and support members 16, other embodiments contemplate an alternative or additional hinge point provided elsewhere in the system or rack member 2. For example, it is contemplated that each of the first and second support members 4a, 4b comprise a hinge along their length to allow for rotation of an upper portion of the members 4a, 4b and the upper portion of the rack member 2.

In some embodiments, the rack member 2 is operable to rotate about an axis defined by a fastener 31b through apertures 9 in the mounting brackets 18. For example, various supports and fasteners may be selectively removed or loosened such that the rack member 2 is rotatable about a pin or fastener 31b secured through apertures 9 of the mounting brackets 18. One of skill in the art will recognize that the scope of the invention(s) of the present disclosure are not limited to a particular hinge or pivot point, and that various pivot points may be provided without deviating from the scope and spirit of the disclosure.

The rack member 2 of the embodiment of FIGS. 1-8 is operable to selectively hinge forward. Specifically, the rack member 2 is selectively rotatable by uncoupling a connection between the attachment plates 10a, 10b and a connected feature (e.g. an additional rack member or a vehicle, see FIG. 30 wherein attachment plates 10a, 10b are coupled to a roof rack 58 with fasteners), uncoupling the connection between the mounting brackets 18a, 18b and the respective support members 17a, 17b by removing the fastener 36, removing fastener 31a from the cowling 42, and rotating the upper portion of the rack member 2 forward about an axis of rotation 40 that extends between opposing pivot points 14a, 14b. In one embodiment, the axis of rotation 40 is substantially parallel to a wheel axle or axis of rotation 28 of the wheels of the vehicle 20. The rack member 2 is thus capable of a forwardly-hinging movement such that the rack member 2 and a windshield 22 of the vehicle 20 may be lowered or rotated to a position proximal to the hood 24 of the vehicle 20.

FIGS. 9-16 are various views of a bracket member 12 according to one embodiment of the present disclosure. As shown, the bracket member 12 comprises a bracket that is selectively securable to a portion of a vehicle 20. In one embodiment, the bracket member 12 generally comprises a clamp plate portion 15 and a transverse portion 38.

The transverse portion 38 can be oriented approximately perpendicular to the clamp plate portion 15. The transverse portion 38 generally includes an aperture or through-hole 19 which defines the pivot axis 40. The through-hole 19 is formed in the transverse portion 38 such that it extends at least partially above the exterior surface of the vehicle 20 (such as one or more pieces of vehicle cowling 42) when the bracket member 12 is secured to the vehicle. In on embodiment, the transverse portion 38 is configured to extend from and above a gap 44 between exterior metal trim members (such as portions of the cowling 42) of the vehicle. Optionally, the upper portion of the transverse portion 38 is rounded or arcuately shaped.

The through-hole 19 can be aligned with an aperture 11 through a flange 46 of a support member 16 as generally illustrated in FIG. 24. In this manner, a fastener 30 can extend through the through-hole 19 and the flange aperture 11 to pivotally interconnect the rack member 2 to the bracket member 12 and the vehicle.

The clamp plate portion 15 is configured to be interconnected to a vehicle, such as generally illustrated in FIGS. 18-19. In some embodiments, the clamp plate portion 15 of the bracket member 12 is secured to the vehicle by a fastener 30a. Accordingly, the clamp plate portion 15 can include a feature 13 to receive the fastener. For example, the bracket member 12 can comprise an aperture 13 within the clamp plate portion 15. In one embodiment, the aperture 13 is elongated to define a slot 13. The slot 13 is operable to receive a shaft of a fastener 30a while a head and/or washer can abut the clamp plate portion 15. The nut, washer and/or other fastener 30a is operable to provide a compressive force on the clamp plate portion 15 and secure the bracket member 12 in a desired position with respect to a vehicle 20 such as generally illustrated in FIG. 22. The slot 13 facilitates aligning the bracket member 12 with the vehicle 20.

In one embodiment, the slot 13 is adapted to engage a fastener 30a associated with a hinge 23 of the vehicle. More specifically, when a portion of cowling 42 has been removed from the vehicle (as generally illustrated in FIGS. 19-20), the hinge fastener 30a can be loosened without removing the fastener from the vehicle. The clamp plate portion 15 can then slide between the head of the fastener 30a and be secured to the vehicle by tightening the fastener 30a.

In some embodiments, the desired position of the bracket member 12 comprises a position wherein a portion of the bracket member 12, such as the transverse portion 38 including the through-hole 19, extends above a hood 24 and/or cowling 42 of a vehicle (such as generally illustrated in FIG. 22). This position, and the structure of the bracket member 12 shown and described herein provide for an attachment and pivot axis 40 for a rack member 2 that is above and proximal to a top surface of a vehicle hood 24 (as shown in FIG. 8, for example). The bracket member 12 preferably comprises a metal, such as steel.

To interconnect the rack member 2 to a vehicle, fasteners 31 are removed from the vehicle to remove a portion of the cowling 42b as generally illustrated in FIG. 18. In this manner, with the cowling removed, the screw or bolt 30a associated with a hinge 23 (illustrated in FIG. 19) can be loosened. The bracket member 12 can then slide into position between a head of the bolt 30a and the hinge. The bolt 30a can then be re-tightened to secure the bracket member 12 to the vehicle as generally illustrated in FIGS. 19-22.

Referring now to FIGS. 21A-21C, a support strap 48 can optionally be interconnected to the vehicle. The support strap 48 can be formed from piece of metal material, such as a thin piece of steel. In one embodiment, the support strap 48 generally includes a first portion 50 and a second portion 52. Apertures 54 can be formed through the first and second portions 50, 52. Optionally, aperture 54B can be elongated, such as to form a closed slot, to facilitate adjustment of the support strap 48 relative to the vehicle.

The first portion 50 can be oriented approximately perpendicular to the second portion 52. Optionally, the support strap 48 is folded or bent one or more times such that the first and second portions 50, 52 are in a predetermined orientation.

To interconnect the support strap 48 to a vehicle, a screw or bolt 56 associated with a hinge 57 of a front door of the vehicle can be removed. The second portion 52 of the support strap 48 can then be positioned proximate to the door hinge. A first aperture 54a of the support strap 48 can be aligned with an aperture 34a for the cowling (generally illustrated in FIG. 18) that was previously removed to install the bracket members 12.

Optionally, the fastener 31a removed from aperture 34a can be reinstalled through the first aperture 54a of the support strap 48 and the aperture 34a in the vehicle as shown in FIG. 21B. A second aperture 54b of the support strap 48 can be aligned with an aperture for the hinge bolt 56. The hinge bolt 56 can then be threaded back into the vehicle through the second aperture 54b of the support strap 48 and a plate of the hinge 57 as generally illustrated in FIG. 21C. The cowling 42b can then be reinstalled using only the upper two fasteners 31c, 31d as generally illustrated in FIG. 28.

Referring now to FIG. 24, the rack member 2 can be pivotally interconnected to the bracket members 12 with a fastener 30. More specifically, the fastener can extend through an aperture 11 in the flange 46 of the support member 16 and through the through-hole 19 of the bracket member 12 to rotatably interconnect the rack member 2 to the vehicle 20.

Referring now to FIG. 28, the mounting bracket 18 can be interconnected to the rack member 2 with another fastener 36. More specifically, aperture 11b of the mounting plate 18 can be aligned with aperture 11b of the support member 17. A fastener 36 can then be secured in the apertures 11b to interconnect the mounting bracket 18 to the rack member 2.

The mounting bracket 18 can also be releasably interconnected to the vehicle 20 to provide additional stability or support to the rack member 2. Aperture 11a of the mounting bracket 18 can be aligned with aperture 11a of the support member 17 as well as the cowling aperture 34a (illustrated in FIG. 18). Similarly, aperture 9 of the mounting bracket 18 can be aligned with cowling aperture 34b (illustrated in FIGS. 18 and 28). Cowling fastener 31a can then be positioned in apertures 11a, 34a as generally illustrated in FIG. 29. If the optional support strap 48 is used as described in FIGS. 21A-21C, the cowling fastener 31a will also extend through the first aperture 54A of the support strap 48 to provide additional support to the rack member 2. The catch 26 of the mounting bracket 18 can be positioned to engage a rearward edge of the support member 17 (as shown in FIG. 29) as the fastener 31a is threaded into the apertures 11a, 34a. Another cowling fastener 31b can be positioned in apertures 9, 34b as shown in FIG. 30.

As shown in FIG. 23, the vehicle hood 24 may include support pads 32a, 32b that selectively receive and support a windshield 22 in a lowered position. The support members 4 can have a length such that the horizontal supports 6 do not rest on the support pads 32 when the rack 2 is rotated to the second position proximate to the vehicle hood as generally illustrated in FIG. 25. Accordingly, the support pads 32 can cushion the windshield 22 with interference from the rack member 2.

As shown in FIG. 19, a preexisting hinge 23 is provided with the vehicle 20 proximal to the cowling 42 and below the windshield 22. This hinge is provided to allow the windshield 22 to rotate toward the hood 24. Embodiments of the present disclosure contemplate that the depicted hinge 23 is also provided as the pivot point or point of rotation for the rack member 2. Specifically, it is contemplated that a bracket member 2 may be provided with the preexisting hinge 23 that operates in a similar manner as the depicted bracket member 12. Additionally, it is contemplated that the hinge bolt may be extended to provide extra length to accommodate a bracket and/or directly receive the rack member(s) (at 16a, 16b, for example).

FIGS. 25-27 provide various views of an installed rack member 2 in a second (or lowered) position, thus enabling lowering of the vehicle's windshield 22 toward the hood 24.

FIGS. 28-29 illustrate installation of a mounting bracket 18 according to one embodiment of the present disclosure. A fasteners 31a can be positioned through apertures 11a of the mounting bracket 18 and the support member 17 and into a preexisting aperture 34a for the cowling 42b in the vehicle 20. Another fastener 31 b can extend through aperture 9 of the mounting bracket 18 and into an existing aperture 34b of the vehicle. Because the fasteners 34a, 34b are secured in existing vehicle apertures 31a, 31b, no new holes are required to be formed in the vehicle to interconnect the rack member 2. FIG. 30 depicts the rack member 2 on a vehicle 20. The rack member 2 and the windshield 22 are illustrated in the upright or first position of use. A roof rack 58 is shown connected to the attachment plates 10 of the rack member 2.

Various features and embodiments of vehicle racks devices are provided herein. It will be recognized, however, that various features are not necessarily specific to certain embodiments and may be provided on any one or more embodiments. The present disclosure and embodiments provided herein are not mutually exclusive and may be combined, substituted, and omitted. The scope of the invention (s) provided herein is thus not limited to any particular embodiment, drawing, or particular arrangement of features.

While various embodiments of the present disclosure have been described in detail, it is apparent that modifications and alterations of those embodiments will occur to those skilled in the art. However, it is to be expressly understood that such modifications and alterations are within the scope and spirit of the present disclosure. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A rotatable rack adapted for use with a vehicle, comprising:
    a first bracket member that is selectively securable to the vehicle such that a first through-hole of the first bracket member extends from a first gap between exterior panels of the vehicle;
    a second bracket member that is selectively securable to the vehicle such that a second through-hole of the second bracket member extends from a second gap between exterior panels of the vehicle; and
    a rack member adapted to be associated with the vehicle and positioned adjacent to a windshield of the vehicle, the rack member configured to be pivotally interconnected to the first and second through-holes, wherein the rack member is capable of movement from a first position of use adjacent to the windshield to a second position of use proximate to a hood of the vehicle.

2. The rotatable rack of claim 1, wherein the first bracket member comprises a first clamp plate configured to engage a first fastener under the exterior panels of the vehicle, and wherein the second bracket member comprises a second clamp plate configured to engage a second fastener under the exterior panels of the vehicle.

3. The rotatable rack of claim 2, wherein the first and second clamp plates each include a slot to receive the respective first and second fasteners.

4. The rotatable rack of claim 2, wherein the first fastener is associated with a first hinge pivotally interconnecting the windshield to the vehicle, and wherein the second fastener is associated with a second hinge pivotally interconnecting the windshield to the vehicle.

5. The rotatable rack of claim 2, wherein the first bracket member includes a first transverse member extending from the first clamp plate, wherein the second bracket member includes a second transverse member extending from the second clamp plate, and wherein the first through-hole is formed through the first transverse member and the second through-hole is formed through the second transverse member.

6. The rotatable rack of claim 1, wherein the rack member is rotatable about a pivot axis that is defined by the first and second through-holes.

7. The rotatable rack of claim 6, wherein the pivot axis is above the exterior panels and is substantially parallel to a wheel axle of the vehicle.

8. The rotatable rack of claim 1, further comprising a first mounting bracket configured to be secured to a support member of the rack member, the first mounting bracket including a first aperture to receive a cowling fastener to interconnect the first mounting bracket and a first exterior panel to the vehicle, the first exterior panel defining part of the first gap between exterior panels.

9. The rotatable rack of claim 8, wherein the first mounting bracket includes a catch extending transverse to the first mounting bracket, the catch extending in a direction toward the vehicle to contact an edge of the support member when the first mounting bracket is interconnected to the vehicle.

10. The rotatable rack of claim 8, further comprising a first support strap secured to a door hinge of the vehicle and including a first strap aperture adapted to be aligned with the first aperture of the first mounting bracket such that the cowling fastener can extend through both the first aperture and the first strap aperture.

11. The rotatable rack of claim 8, wherein to rotate the rack member from the first position of use to the second position of use the first mounting bracket is separated from the support member of the rack member and the cowling fastener is removed from the first aperture.

12. A system for pivotally interconnecting a rotatable rack member proximate to a windshield of a vehicle, comprising:
    a bracket member adapted to be interconnected to the vehicle, including:
        a clamp plate portion with a first aperture to receive a fastener to secure the bracket member to the vehicle, wherein the clamp plate portion is positioned inwardly relative to a first exterior panel and a second exterior panel of the vehicle when the bracket member is secured to the vehicle;
        a transverse portion extending from the clamp plate portion, the transverse portion adapted to extend through a gap between the first and second exterior panels when the bracket member is secured to the vehicle; and
        a bracket aperture formed through the transverse portion that is positioned outwardly relative to the first and second exterior panels when the bracket member is secured to the vehicle; and
    a support member extending from the rotatable rack member, the support member including a flange with a flange aperture configured to align with the bracket aperture of the bracket member, wherein a fastener is positionable through the flange aperture and the bracket aperture to pivotally interconnect the rotatable rack member to the bracket member, and wherein the fastener defines a pivot axis about which the rotatable rack member can rotate from a first position of use proximate to the windshield to a second position of use proximate to a hood of the vehicle.

13. The system of claim 12, further comprising a mounting bracket configured to be attached to the support member, the mounting bracket including a through hole to receive a cowling fastener to interconnect the mounting bracket and the second exterior panel to the vehicle.

14. The system of claim 13, wherein the mounting bracket includes a catch configured to contact a rearward portion of the support member when the rotatable rack member is in the first position of use proximate to the windshield.

15. The system of claim 13, further comprising a support strap with a first portion that includes a strap aperture to receive the cowling fastener and a second portion to engage a hinge plate of a door hinge of the vehicle.

16. The system of claim 12, wherein the rotatable rack member further comprises an attachment plate configured to interconnect the rotatable rack member to a roof rack interconnected to the vehicle.

17. The system of claim 12, wherein the pivot axis is generally parallel to a rotation axis defined by a hinge interconnected to the windshield.

18. A method of interconnecting a rotatable rack to a vehicle, comprising:
    securing a first bracket member to the vehicle such that a first through-hole of the first bracket member extends from a first gap between exterior panels of the vehicle;
    securing a second bracket member to the vehicle such that a second through-hole of the second bracket member extends from a second gap between exterior panels of the vehicle; and
    pivotally interconnecting the rotatable rack to the first and second bracket members by securing first and second fasteners through the first and second through-holes, wherein the rotatable rack is capable of movement from a first position of use adjacent to a windshield of the vehicle to a second position of use proximate to a hood of the vehicle.

19. The method of claim 18, wherein pivotally interconnecting the rotatable rack to the first and second bracket members further comprises:
   extending the first fastener through the first through-hole and through a first flange aperture of a first flange of the rotatable rack; and
   extending the second fastener through the second through-hole and through a second flange aperture of a second flange of the rotatable rack.

20. The method of claim 18, further comprising:
   securing a first mounting bracket to a first support member of the rotatable rack;
   interconnecting the first mounting bracket and a first exterior panel to the vehicle with a first cowling fastener, the first exterior panel defining part of the first gap between exterior panels;
   securing a second mounting bracket to a second support member of the rotatable rack; and
   interconnecting the second mounting bracket and a second exterior panel to the vehicle with a second cowling fastener, the second exterior panel defining part of the second gap between exterior panels.

* * * * *